US010960925B2

(12) United States Patent
Fujiki et al.

(10) Patent No.: US 10,960,925 B2
(45) Date of Patent: *Mar. 30, 2021

(54) WORK VEHICLE

(71) Applicant: Yanmar Power Technology Co., Ltd., Osaka (JP)

(72) Inventors: Katsumi Fujiki, Osaka (JP); Keisuke Iwamura, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 197 days.

This patent is subject to a terminal disclaimer.

(21) Appl. No.: 15/576,025

(22) PCT Filed: Mar. 4, 2016

(86) PCT No.: PCT/JP2016/056772
§ 371 (c)(1),
(2) Date: Nov. 21, 2017

(87) PCT Pub. No.: WO2016/189917
PCT Pub. Date: Dec. 1, 2016

(65) Prior Publication Data
US 2018/0154934 A1 Jun. 7, 2018

(30) Foreign Application Priority Data

May 25, 2015 (JP) .............................. JP2015-105791

(51) Int. Cl.
| *B62D 11/08* | (2006.01) |
| *B62D 11/14* | (2006.01) |
| *B62D 11/18* | (2006.01) |
| *B62D 11/00* | (2006.01) |

(52) U.S. Cl.
CPC ............ *B62D 11/08* (2013.01); *B62D 11/003* (2013.01); *B62D 11/005* (2013.01);
(Continued)

(58) Field of Classification Search
CPC ... B62D 11/003; B62D 11/005; B62D 11/006; B62D 11/18; B62D 11/08; B62D 11/14; B62D 11/183; A01B 69/00
(Continued)

(56) References Cited

U.S. PATENT DOCUMENTS

| 6,345,674 B1 * | 2/2002 | Easton ................. B62D 11/183 |
| | | 180/403 |
| 7,273,126 B2 * | 9/2007 | Inoue .................... B60K 17/105 |
| | | 180/337 |

(Continued)

FOREIGN PATENT DOCUMENTS

| JP | 11-078957 A | 3/1999 |
| JP | 2005-083497 A | 3/1999 |

(Continued)

OTHER PUBLICATIONS

Korean Office Action dated Dec. 19, 2018 issued in corresponding KR Application No. 10-2017-7031455.

(Continued)

*Primary Examiner* — Anne Marie M Boehler
(74) *Attorney, Agent, or Firm* — Norton Rose Fulbright US LLP

(57) ABSTRACT

A work vehicle includes an engine mounted on a traveling body, a straight-traveling system transmission path including a first stepless transmission device, and a turning system transmission path including a second stepless transmission device, the work vehicle being configured to combine outputs of the straight-traveling system transmission path and an output of the turning system transmission paths to drive left and right traveling units. The work vehicle also includes control sections that control the outputs of the straight-traveling system transmission path and the output of the turning system transmission paths in cooperation with each other, a transmission operation tool that specifies the output (Continued)

of the straight-traveling system transmission path, and a detector that detects the output of the straight-traveling system transmission path. The control sections select one of an instruction value from the transmission operation tool and an actually measured value from the detector and set the output of the turning system transmission path.

20 Claims, 19 Drawing Sheets

(52) U.S. Cl.
CPC ............ *B62D 11/006* (2013.01); *B62D 11/18* (2013.01); *B60Y 2200/221* (2013.01)

(58) Field of Classification Search
USPC .............................................. 475/19, 21, 28
See application file for complete search history.

(56) References Cited

U.S. PATENT DOCUMENTS

| 7,431,123 | B2* | 10/2008 | Irikura ................... | A01D 69/03 |
| | | | | 180/307 |
| 8,485,286 | B2* | 7/2013 | Thompson ........... | B60K 7/0007 |
| | | | | 180/6.44 |
| 2003/0050145 | A1* | 3/2003 | Hasegawa ............ | B60K 17/105 |
| | | | | 475/24 |
| 2007/0198158 | A1* | 8/2007 | Ishibashi .............. | B62D 11/003 |
| | | | | 701/50 |
| 2014/0288763 | A1* | 9/2014 | Bennett .................. | B62D 11/18 |
| | | | | 701/31.6 |
| 2019/0047620 | A1* | 2/2019 | Iwamura ................ | B62D 11/06 |

FOREIGN PATENT DOCUMENTS

| JP | 2001-163241 | A | | 6/2001 |
| JP | 2001-255951 | | * | 9/2001 |
| JP | 2002-059753 | A | | 2/2002 |
| JP | 2006-096134 | A | | 4/2006 |
| JP | 2011-160767 | A | | 8/2011 |
| KR | 10-2010-0125165 | A | | 11/2010 |

OTHER PUBLICATIONS

International Search Report dated May 24, 2016 issued in corresponding PCT Application PCT/US2016/056772.

* cited by examiner

WORK VEHICLE

CROSS REFERENCES TO RELATED APPLICATIONS

This application is a national stage application pursuant to 35 U.S.C. § 371 of International Application No. PCT/JP2016/056772, filed on Mar. 4, 2016, which claims priority under 35 U.S.C. § 119 to Japanese Patent Application No. 2015-105791, filed on May 25, 2015, the disclosures of which are hereby incorporated by reference in their entireties.

TECHNICAL FIELD

The present invention relates to a work vehicle such as an agricultural machine typified by a tractor and a specialized work machine typified by a crane truck.

BACKGROUND ART

Some conventional work vehicles such as tractors and roller cranes include a work vehicle including two hydraulic stepless transmissions (HST) to which a driving force is transferred from an engine, and each of the two HSTs outputs a straight-traveling force and a turning force based on an engine output. The inventor of this application previously proposed, in Patent Literature 1 (PTL 1), a work vehicle in which a straight-traveling force and a turning force output from each of the two HSTs are combined by left and right planetary gear mechanisms to enable the work vehicle to turn.

Some work vehicles such as a tractor or a wheel loader include a work vehicle in which a hydro-static mechanical transmission (HMT) having a transmission efficiency higher than that of an HST is housed a transmission case to which a driving force is transmitted from an engine. The inventor also previously proposed, in Patent Literature 2 (PTL 2), an in-line hydro-static mechanical transmission in which a hydraulic pump and a hydraulic motor are disposed in line in such a manner that an input shaft of the hydraulic pump and an output shaft of the hydraulic motor are disposed concentrically.

In the in-line hydro-static mechanical transmission, the output shaft is rotatably fitted onto the input shaft to which a driving force is transmitted from the engine. A hydraulic pump, a cylinder block, and a hydraulic motor are also fitted onto the input shaft. The cylinder block alone is used for both the hydraulic pump and the hydraulic motor, and a driving force is transmitted from the hydraulic motor to the output shaft. Thus, unlike a typical hydro-static mechanical transmission, the in-line hydro-static mechanical transmission can combine a shifted driving force by hydraulic pressure and a driving force of the engine without interposition of planetary gear mechanisms so that high power transmission efficiency can be obtained advantageously.

CITATION LIST

Patent Literatures

PTL 1: Japanese Patent Application Laid-Open No. 2002-59753
PTL 2: Japanese Patent Application Laid-Open No. 2005-83497

SUMMARY OF INVENTION

Technical Problem

To mount the hydro-static mechanical transmission of PTL 2 on a middle- or large-sized work vehicle, an output of the hydro-static mechanical transmission needs to be increased. To increase the output of the hydro-static mechanical transmission, the capacity of the hydro-static mechanical transmission can be increased, for example. However, simply increasing the capacity of the hydro-static mechanical transmission has problems that the size of the hydro-static mechanical transmission itself increases to sacrifice a power transmission efficiency (especially an efficiency in a low load range) as well as to increase manufacturing costs.

In the case of mounting the mechanism in PTL 1 on a large-sized work vehicle, the size of the mechanism also increases with an increase in the output of the hydraulic stepless transmission. Thus, not only the weight of the work vehicle increases but also a power transmission efficiency is lower than that of the hydro-static mechanical transmission, which limits a transmission range in a straight-traveling direction (main transmission range).

In addition, a controller for controlling a traveling operation needs to integrate signals from operation tools for main transmission, forward-reverse movement, and turning to control swash plate angles of the two hydraulic stepless transmissions. Thus, the controller needs to a complicated control flow. To achieve this, the controller has a high computation load in a control flow of a traveling operation, and thus, an operator might feel strangeness in operation.

Solution to Problem

It is therefore a technical object of some aspects of the present invention to provide a work vehicle improved in view of the foregoing circumstances.

A work vehicle according to an aspect of the present invention includes an engine that is mounted on a vehicle body, a straight-traveling system transmission path including a first stepless transmission device, and a turning system transmission path including a second stepless transmission device and is configured to combine an output of the straight-traveling system transmission path and an output of the turning system transmission path to drive left and right traveling units. The work vehicle includes: a control section that controls the output of the straight-traveling system transmission path and the output of the turning system transmission path in cooperation with each other; a transmission operation tool that specifies the output of the straight-traveling system transmission path; and a detector that detects the output of the straight-traveling system transmission path, wherein the control section selects one of an instruction value from the transmission operation tool and an actually measured value from the detector to set the output of the turning system transmission path.

In the work vehicle, the straight-traveling system transmission path may include a forward-reverse switching mechanism, the forward-reverse switching mechanism may include a reverse clutch, a forward low-speed clutch, and a forward high-speed clutch, and in switching between the reverse clutch and the forward low-speed clutch or switching between the forward low-speed clutch and the forward high-speed clutch, the control section may perform control in such a manner that one of the reverse clutch and the forward low-speed clutch or one of the forward low-speed clutch and the forward high-speed clutch is constantly engaged.

In the work vehicle, in a case where each of the clutches is disengaged in traveling, the output of the turning system transmission path may be set in accordance with the actually measured value from the detector.

In the work vehicle, in a case where a brake is operated in traveling, the control section may set the output of the turning system transmission path in accordance with the actually measured value from the detector, and the control section may control the clutches in such a manner that each of the clutches is disengaged in a high-speed range where a traveling speed is a predetermined speed or more, and one of the reverse clutch and the forward low-speed clutch or one of the forward low-speed clutch and the forward high-speed clutch is engaged in a low-speed range where the traveling speed is less than the predetermined speed.

A work vehicle according to an aspect of the present invention includes: an engine that is mounted on a traveling body; a straight-traveling system transmission path including a first stepless transmission device; and a turning system transmission path including a second stepless transmission device, and combines an output of the straight-traveling system transmission path and an output of the turning system transmission path to drive left and right traveling units. The work vehicle further includes: a control section that controls the output of the straight-traveling system transmission path and the output of the turning system transmission path in cooperation with each other; and a steering wheel that can be rotatably operated. The control section decelerates the output of the turning system transmission path with deceleration of the output of the straight-traveling system transmission path. When the steering wheel is operated, the control section accelerates the output of the turning system transmission path and decelerates the output of the straight-traveling system transmission path to determine a speed ratio between the left and right traveling units in turning based on a steering angle of the steering wheel. In this manner, the traveling body can be turned in accordance with the amount of operation of the steering wheel, which contributes to enhancement of operability. In addition, since the output of the straight-traveling system transmission path and the output of the turning system transmission path are in cooperation with each other, the vehicle speed in turning approaches a sense of control of an operator, in addition, a behavior of the traveling body can be stabilized.

In the work vehicle, if the steering angle of the steering wheel is less than the predetermined value, the control section decelerates the inner traveling unit, if the steering angle of the steering wheel is the predetermined value, the inner traveling unit is stopped, and if the steering angle of the steering wheel exceeds the predetermined value, the inner traveling unit is controlled to rotate reversely. In this manner, the turning center and the turning radius of the working vehicle can be changed in accordance with the amount of operation of the steering wheel. Thus, the traveling body can be turned in a state close to a sense of operation on the steering wheel, resulting in stable traveling of the traveling body.

In the work vehicle, the control section includes a first control section that controls the output of the straight-traveling transmission path, and a second control section that controls the output of the turning system transmission path. The output of the straight-traveling system transmission path set by the first control section is received by the second control section so that the output of the turning system transmission path is set. In this manner, control can be performed by each of the first and second control sections. Accordingly, the amount of computation of each control section can be reduced so that highly responsive traveling control can be performed. Since the second control section sets the output of the turning system transmission path upon receiving the output from the first control section, computation thereof is not complicated, and thus, traveling control can be more smoothly performed.

Advantageous Effects of Invention

According to some aspects of the present invention, with the configuration in which one of the instruction value from the transmission operation tool and the actually measured value from the detector is selected so that the output of the turning system transmission path is set, the output of the turning system transmission path can be constantly set to be optimum for a traveling state of the traveling body. Thus, an operator can stably control the vehicle in turning the traveling body with enhanced operability, and can perform a stable driving operation.

According to some aspects of the present invention, control is performed in such a manner that in switching between the reverse clutch and the forward low-speed clutch or between the forward low-speed clutch and the forward high-speed clutch, one of the clutches is constantly engaged so that the output of the straight-traveling system transmission path is constantly output. Thus, the output of the turning system transmission path can be set in accordance with the output of the straight-traveling system transmission path. Thus, runaway occurring when a turning operation is performed while a clutch is switched and other problems can be avoided, which contributes to stable operability.

According to some aspects of the present invention, when the clutch is disconnected, the output of the turning system transmission path is set based on the actually measured value. Thus, even in a case where the instruction value significantly differs from the actually measured value, the vehicle can turn at a turning center with a turning radius in accordance with a current traveling state of the traveling body. As a result, the operator can operate a traveling body without incongruity, and contributes to smooth controllability to the operator.

According to some aspects of the present invention, while the brake function is exerted by the brake, the output of the turning system transmission path is set based on the actually measured value. Thus, even in a case where the instruction value significantly differs from the actually measured value, the vehicle can turn at a turning center with a turning radius in accordance with a current traveling state of the traveling body. As a result, the operator can operate the traveling body without incongruity, which contributes to smooth controllability to the operator.

DESCRIPTION OF EMBODIMENTS

Figure 1:
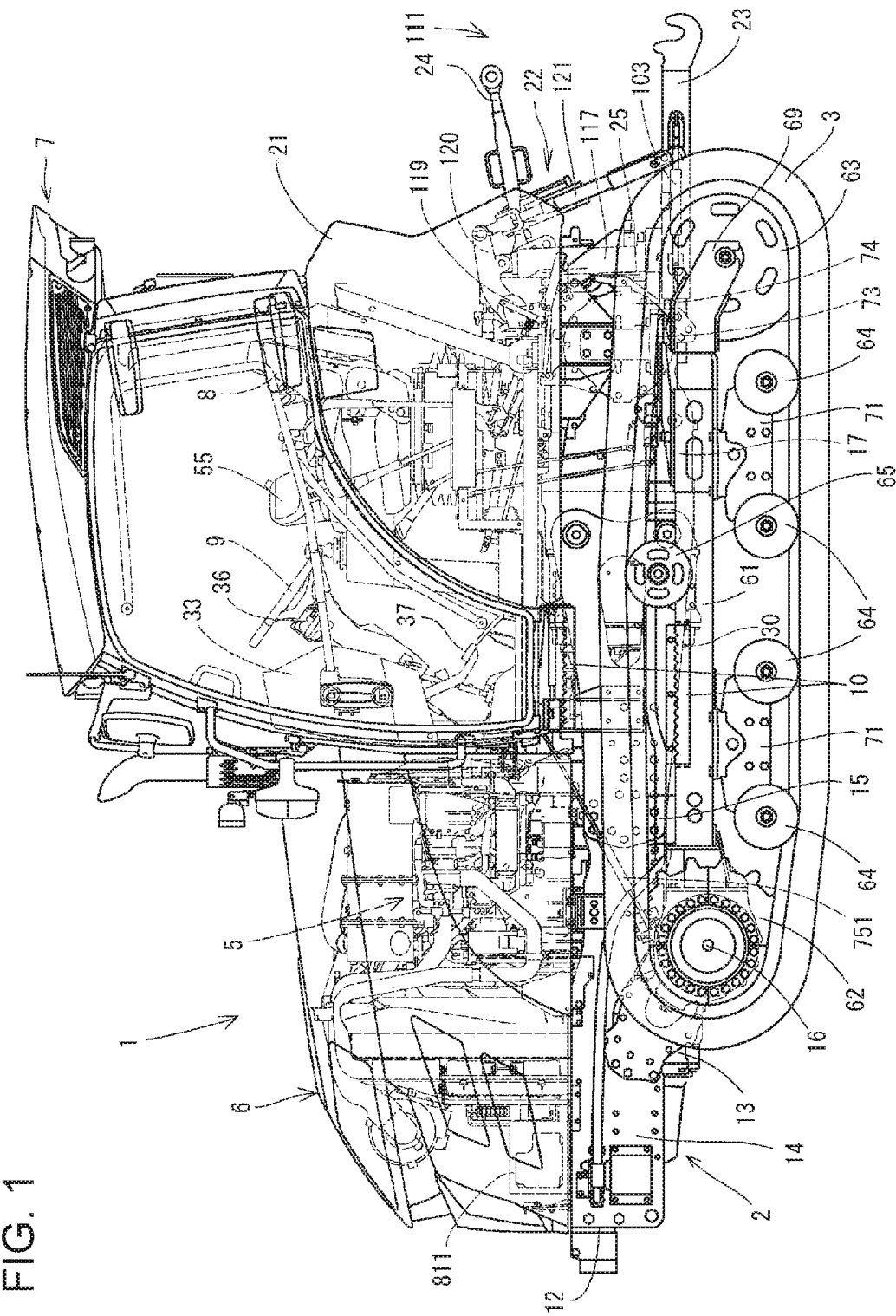
FIG. 1 A left side view of a tractor
FIG. 2 A right side view of the tractor
FIG. 3 A plan view of the tractor
FIG. 4 A plan view of a traveling body
FIG. 5 A plan illustration of a cockpit seat unit
FIG. 6 A perspective view illustrating a configuration of the periphery of a steering wheel
FIG. 7 A perspective view of the cockpit seat unit when viewed from left-forward FIG. 8 A simplified illustration of a power transmission system of a straight-traveling transmission case FIG. 9 A simplified illustration of a power transmission system of a turning transmission case FIG. 10 A skeleton diagram of a power transmission system of the tractor FIG. 11 An illustration showing a relationship between the discharge rate of hydraulic oil of a hydro-static mechanical transmission and a vehicle speed FIG. 12 A hydraulic circuit diagram of the tractor FIG. 13 A block diagram illustrating a configuration of a control system of the tractor FIG. 14 A block diagram illustrating a configuration of a traveling control system of the tractor FIG. 15 A flowchart of a traveling control operation of the tractor FIG. 16 A graph showing a relationship between parameters stored in a deceleration table FIG. 17 A graph showing a relationship between parameters stored in a turning/straight-traveling ratio table FIG. 18 A graph showing a relationship between a steering angle of the steering wheel and the vehicle speed of the tractor FIG. 19 An illustration of an operating screen for selecting a turning mode on an operating monitor FIG. 20 An illustration of an operating screen for specifying a turning force on the operating monitor
Figure 2:
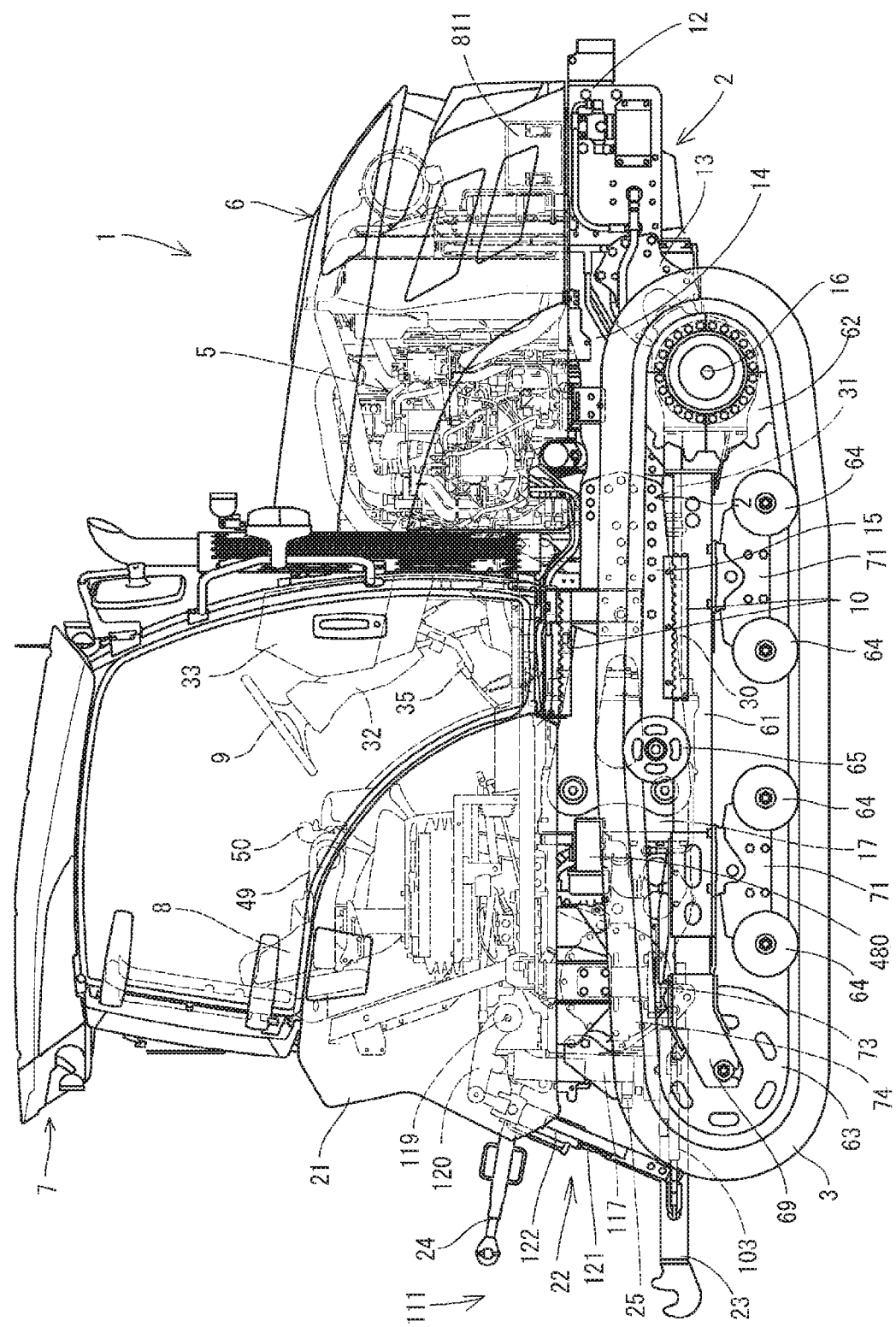

Regarding an embodiment of the present invention, an agricultural tractor will be described hereinafter with reference to the drawings. As illustrated in FIGS. 1 through 4, a traveling body 2 of a tractor 1 is supported by a pair of left and right traveling crawlers 3 serving as a traveling unit. A diesel engine 5 (hereinafter referred to as an engine) is mounted in a front portion of the traveling body 2. The diesel engine 5 drives the traveling crawlers 3 to thereby cause the tractor 1 to travel forward or rearward. The engine 5 is covered with a hood 6. A cabin 7 is disposed on the upper surface of the traveling body 2. In the cabin 7, a cockpit seat 8 and a steering wheel 9 for steering and controlling the traveling crawlers 3. Steps 10 with which an operator walks up and down are externally disposed at the left and right sides of the cabin 7. Fuel tanks (not shown) for supplying fuel to the engine 5 are disposed below the left and right sides of the cabin 7, and are covered with left and right rear fenders 21 from above.

The traveling body 2 is constituted by an engine frame 14 including a front bumper 12 and a turning transmission case (drive axle) 13 and left and right vehicle body frames 15 detachably fixed to a rear portion of the engine frame 14. A vehicle shaft 16 rotatably projects outward from the left and right ends of the turning transmission case 13. Drive sprockets 62 are attached to the left and right ends of the turning transmission case 13 through the vehicle shaft 16. A rear end of the vehicle body frames 15 is coupled to a straight-traveling transmission case 17 for appropriately shifting the speed of a rotative force from engine 5 to transmit the power to the drive sprockets 62.

As illustrated in FIGS. 1 through 4, left and right truck frames 61 are disposed on the lower surface of the traveling body 2. The pair of left and right truck frames 61 extends longitudinally (front-rear direction) and is located at outer sides of the engine frame 14 and the vehicle body frames 15. The left and right truck frames 61 are coupled to the engine frame 14 and the vehicle body frames 15 by lower frames 67 extending laterally (left-right direction). The front ends of the left and right truck frames 61 are coupled to left and right ends of the turning transmission case 13. Lateral centers of the lower frames 67 are fixed to a rear side surface of the engine frame 14 through coupling brackets 72. Rear beams 73 projecting inward from rear portions of the left and right truck frames 61 are coupled to rear housings 74 fixed to left and right side surfaces of the straight-traveling transmission case 17 so that the rear portions of the truck frames 61 are fixed to the left and right side surfaces of the straight-traveling transmission case 17.

The truck frames 61 include the drive sprockets 62 that transmit a driving force from the engine 5 to the traveling crawlers 3, tension rollers 63 that maintain tension of the traveling crawlers 3, a plurality of truck rollers 64 that hold the ground sides of the traveling crawlers 3 at ground, and intermediate rollers 65 that hold non-ground sides of the traveling crawlers 3. The drive sprockets 62 support the front sides of the traveling crawlers 3. The tension rollers 63 support the rear sides of the traveling crawlers 3. The truck rollers 64 support the ground sides of the traveling crawlers 3. The intermediate rollers 65 support the non-ground sides of the traveling crawlers 3. The tension rollers 63 are rotatably supported by the rear ends of tension frames 69 configured to extend and contract rearward of the rear ends of the truck frames 61. The truck rollers 64 are rotatably supported forward and rearward of equalizer frames 71 supported on lower portions of the truck frames 61 to freely swing longitudinally.

Hydraulic lifting and lowering mechanisms 22 that lift and lower a ground work machine (not shown) such as a rotary tiller are detachably attached to a rear portion of the straight-traveling transmission case 17. The ground work machine is coupled to the rear portion of the straight-traveling transmission case 17 through a three-point linkage mechanism 111 including a pair of left and right lower links 23 and a top link 24. A PTO shaft 25 projects rearward from a rear side surface of the straight-traveling transmission case 17 and is used for transmitting a PTO driving force to the work machine such as a rotary tiller.

Figure 3:
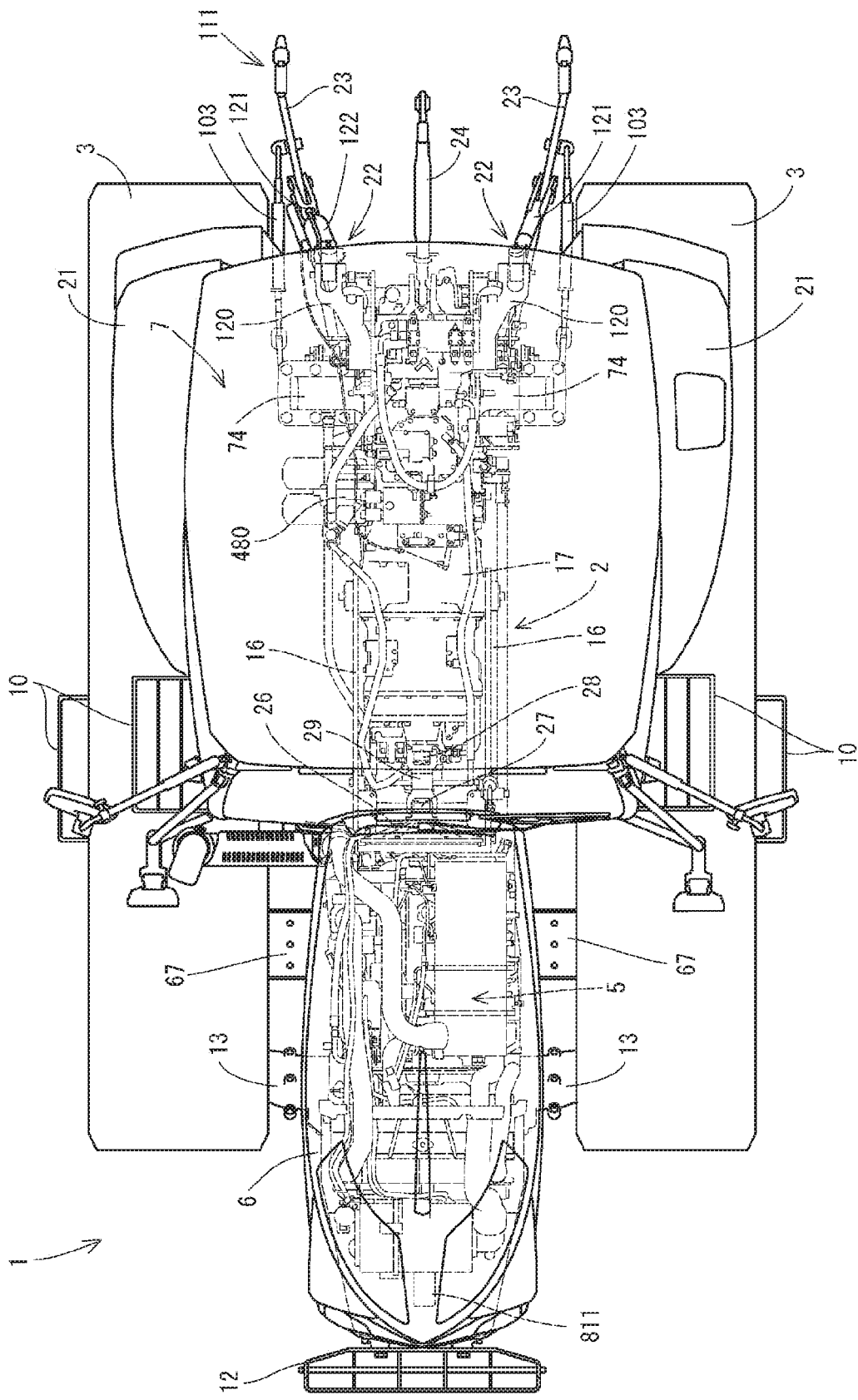
Figure 4:
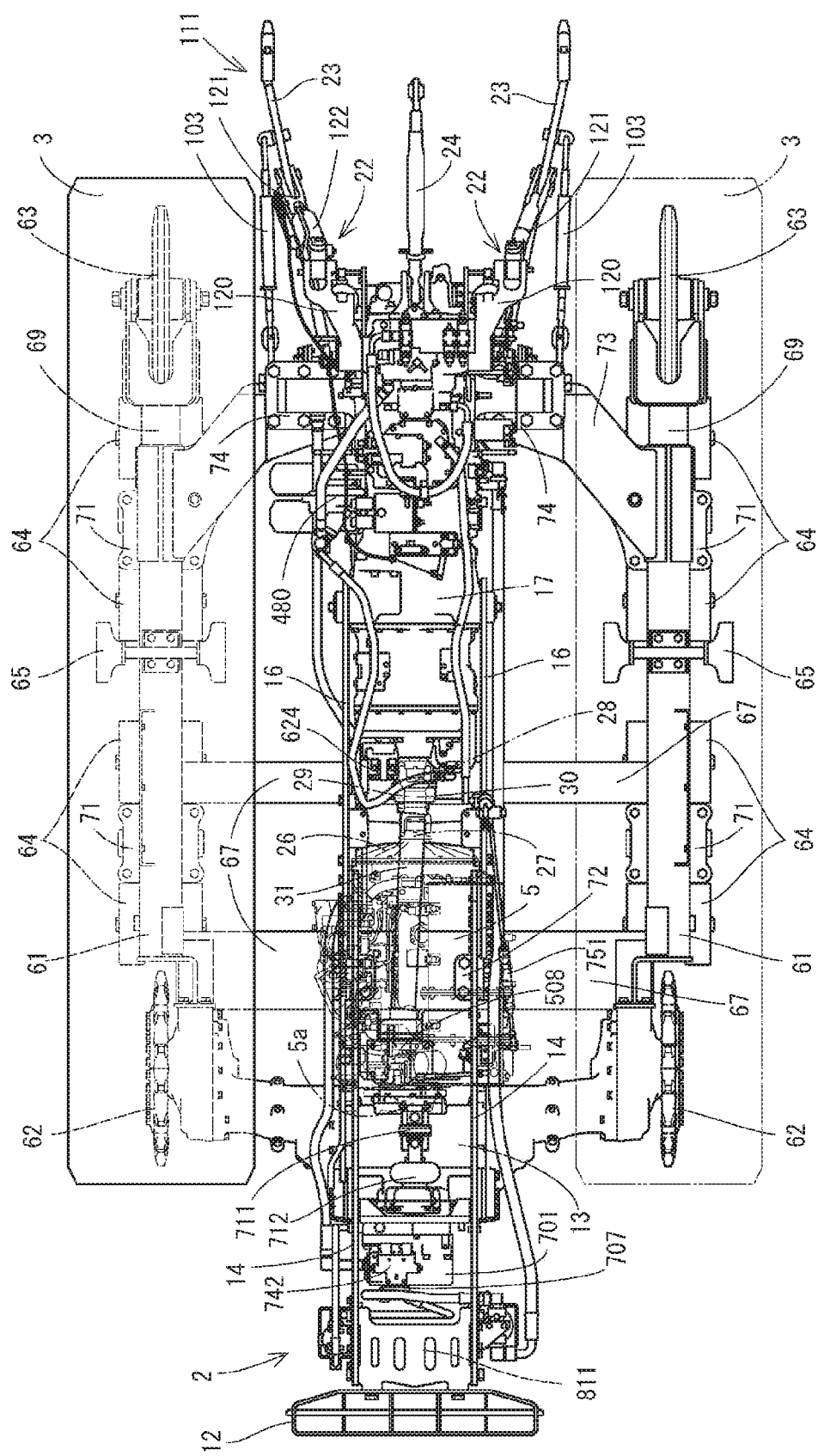

As illustrated in FIGS. 3 and 4, a flywheel 26 is attached to be directly coupled to the rear end of an output shaft (piston rod) 5a of the engine 5 that projects rearward from the rear side surface of the engine 5. A main driving shaft 27 projecting rearward from the flywheel 26 and an input counter shaft 28 projecting forward from the front surface of the straight-traveling transmission case 17 are coupled to each other through a driving force transmission shaft 29 including universal joints on both ends. A straight-traveling input counter shaft 508 projecting rearward from the turning transmission case 13 is coupled to a straight-traveling output shaft 30 projecting forward from a lower portion of the front surface of the straight-traveling transmission case 17 through a driving force transmission shaft 31 including universal joints on both ends. A turning input counter shaft 712 projecting rearward from the turning transmission case 13 is coupled to the front end of the output shaft (piston rod) 5a of the engine 5 projecting forward from the front side surface of the engine 5 through a driving force transmission shaft 711 including universal joints on both ends.

As illustrated in FIGS. 1 through 4, the hydraulic lifting and lowering mechanisms 22 include: left and right hydraulic lift cylinders 117 that are operated and controlled in accordance with an operation on a work unit position dial 51 or the like; left and rear lift arms 120 having base end sides pivotally supported by an upper surface lid of the straight-traveling transmission case 17 through a lift supporting shaft; and left and right lift rods 121 coupling the left and right lift arms 120 to the left and right lower links 23. The right lift rod 121 is partially formed of a horizontal cylinder 122 for hydraulic control, and thus, the length of the right lift rod 121 can be adjusted to be increased or reduced with the horizontal cylinder 122. In this configuration, in a case where the length of the right lift rod 121 is changed by extending or contracting the piston of the horizontal cylinder 122 with the ground work machine supported by the top link 24 and the left and right lower links 23, the left and right tilt angles of the ground work machine are changed.

Figure 5:
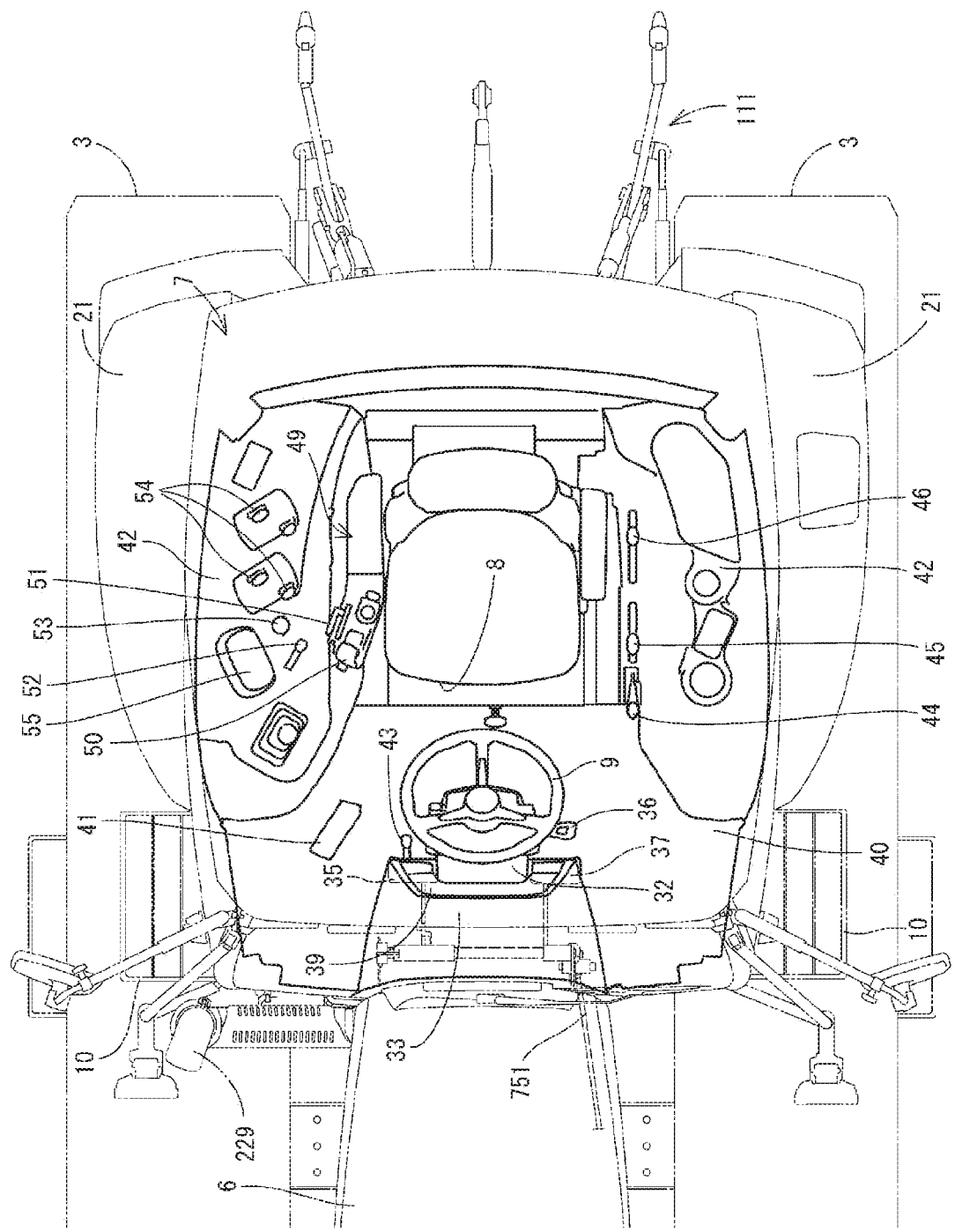
Figure 6:
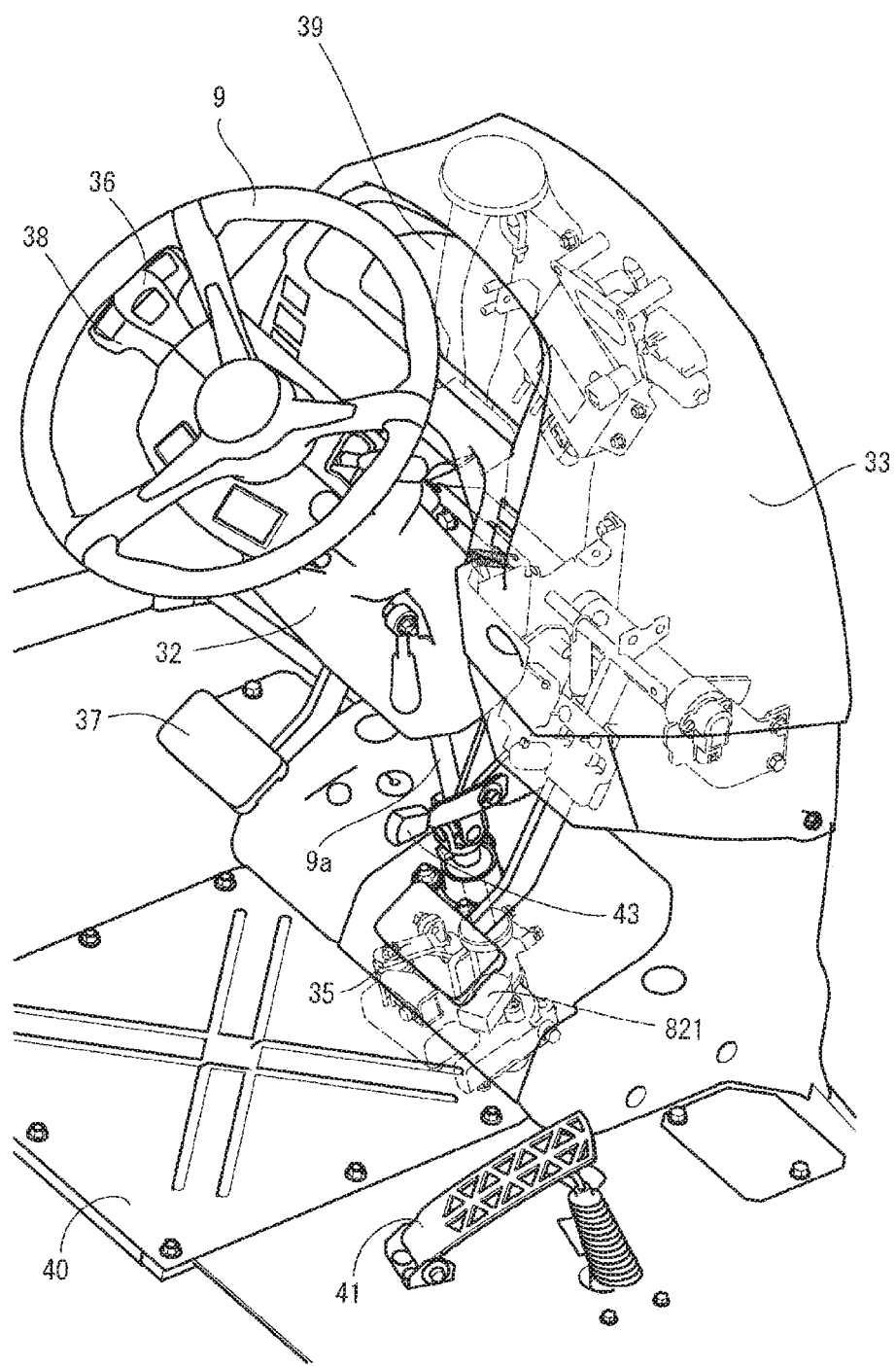
Figure 7:
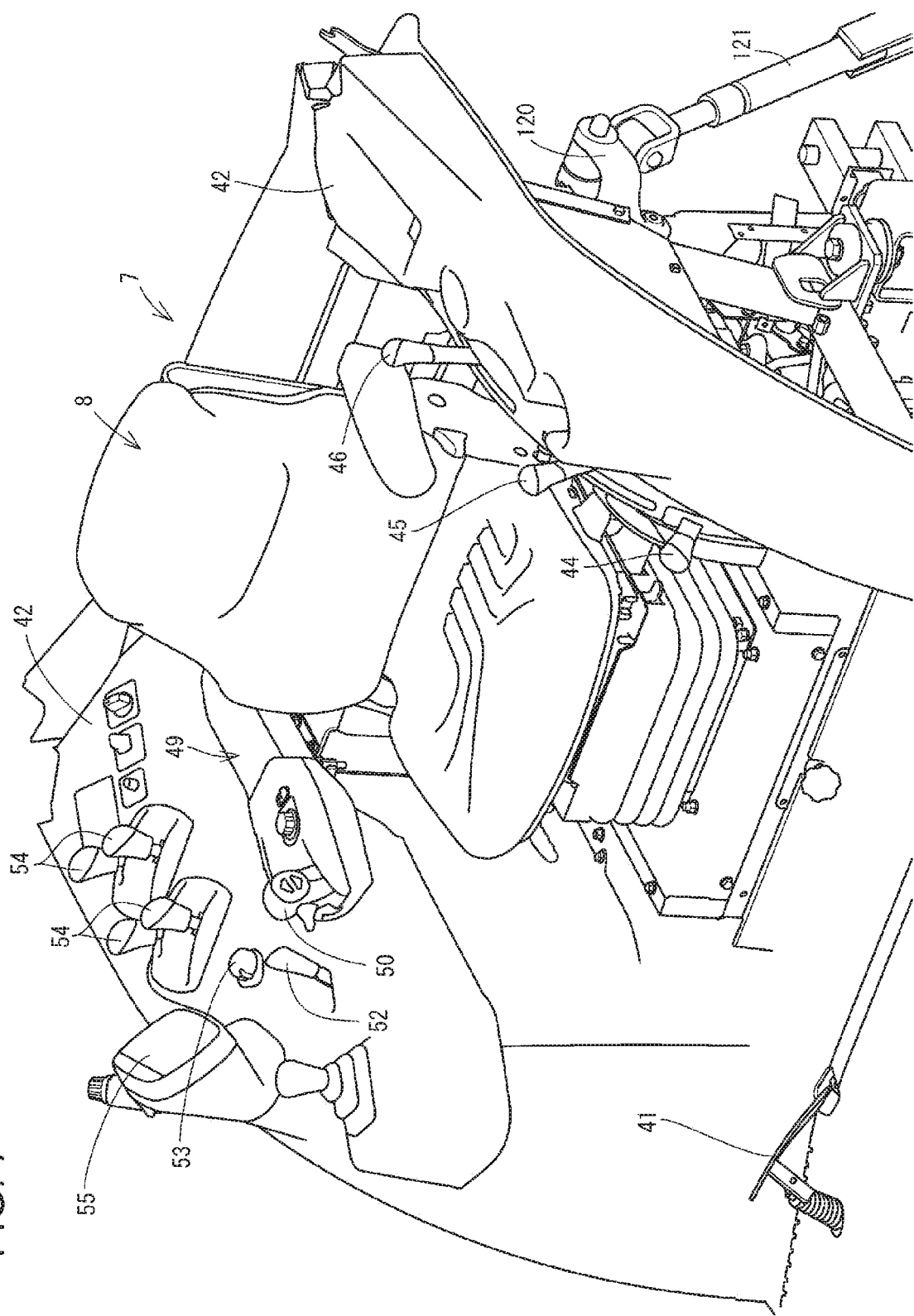
Figure 8:
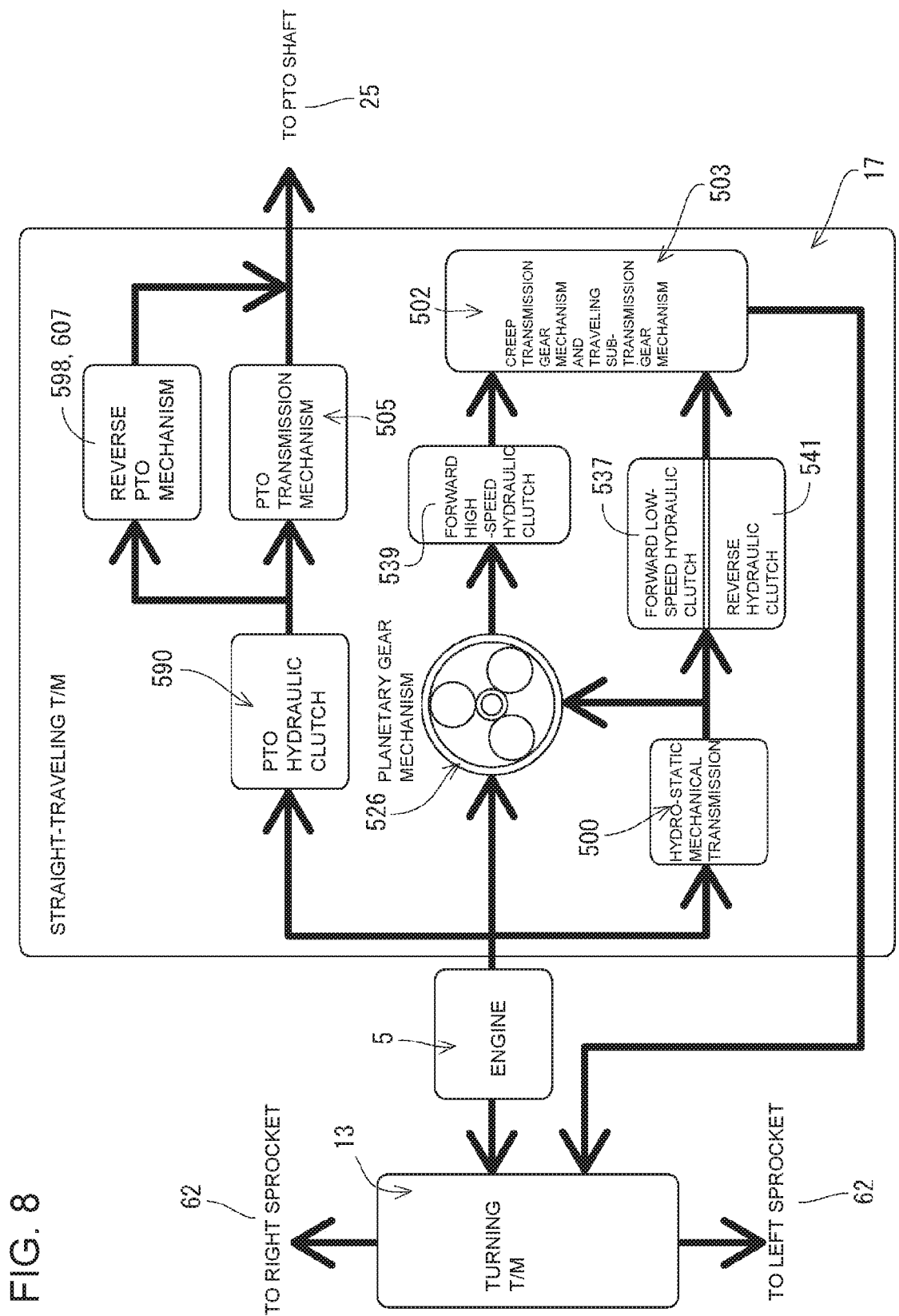
Figure 9:
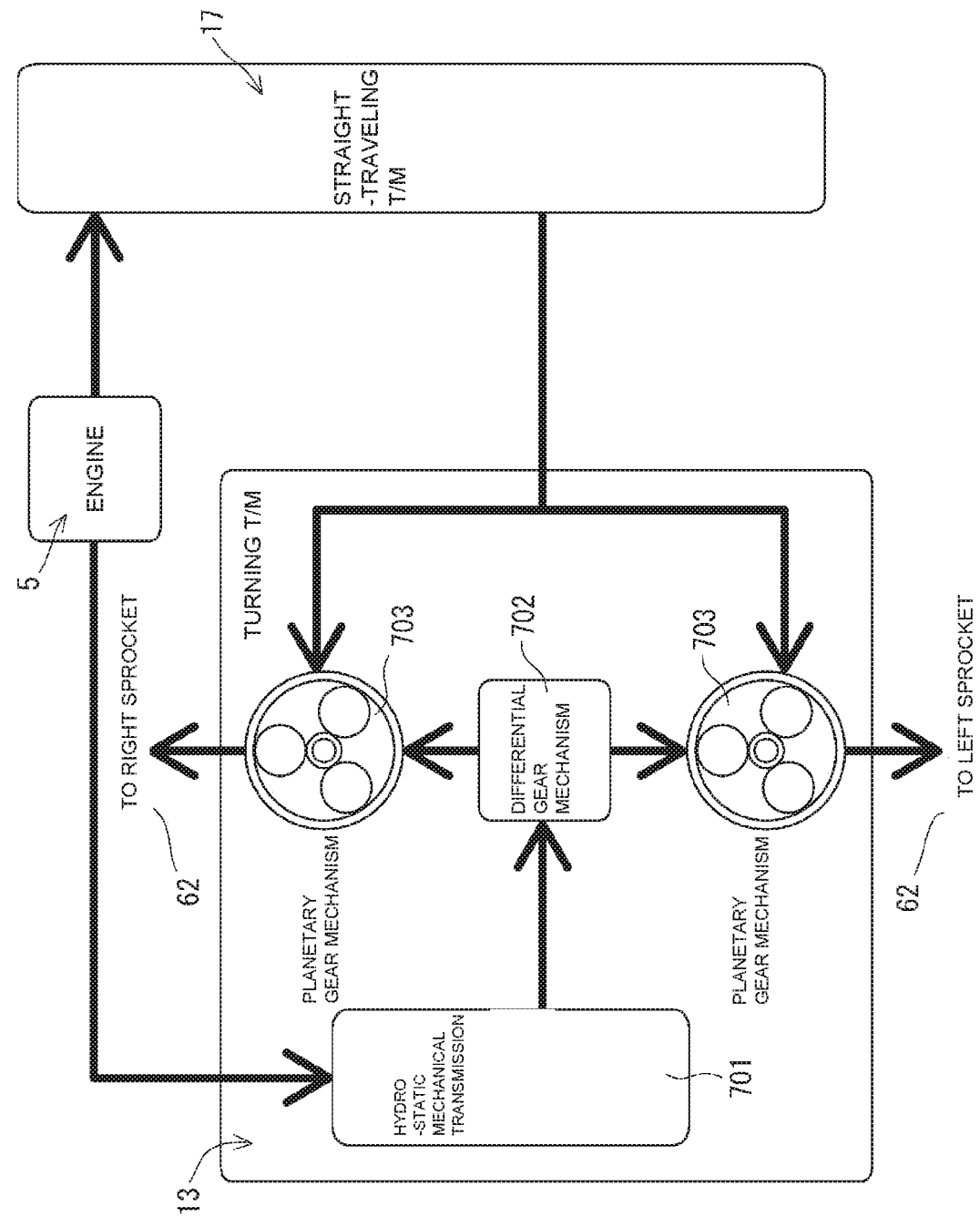
Figure 10:
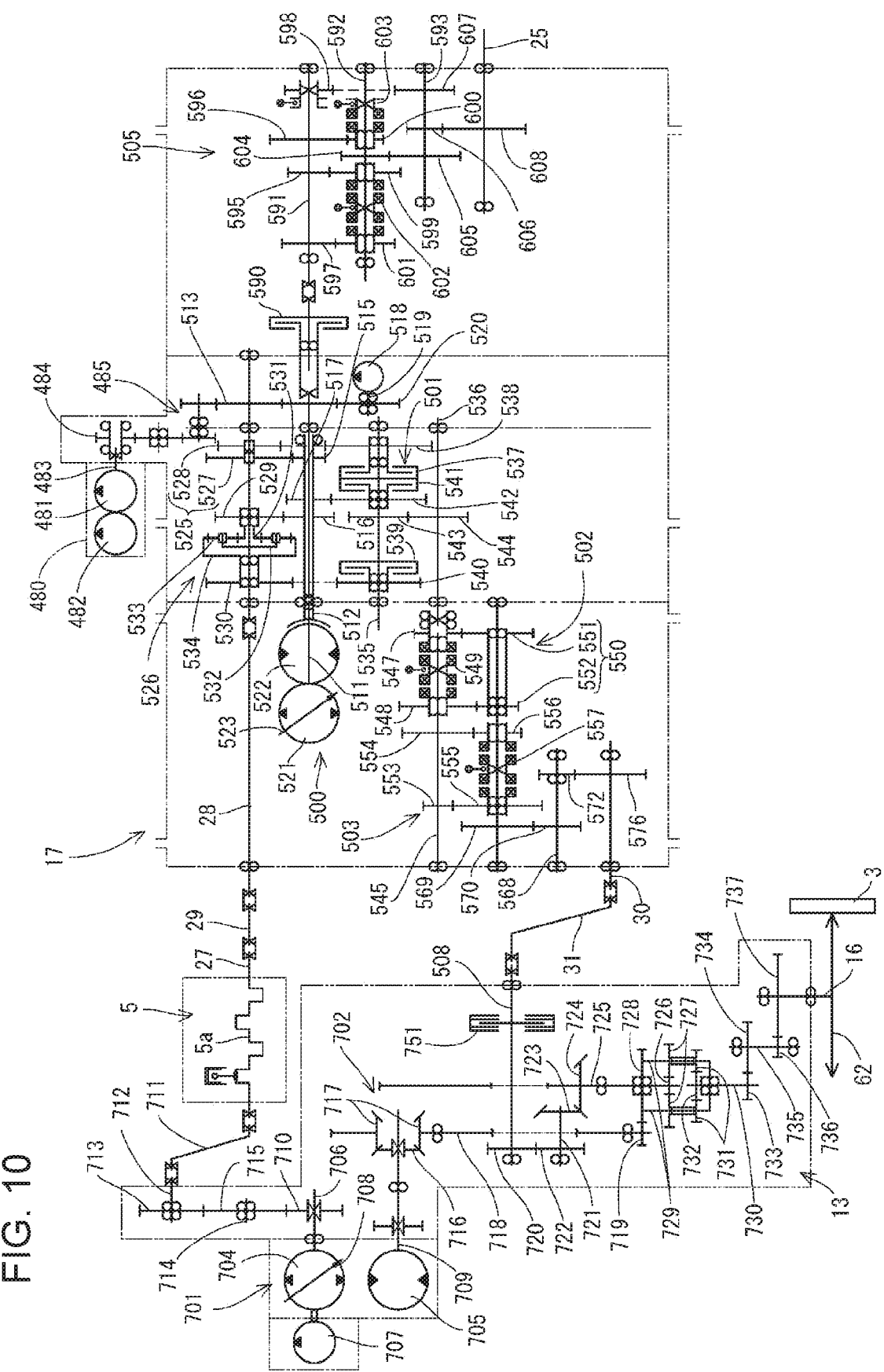

Next, with reference to FIGS. 5 through 7, for example, an internal configuration of the cabin 7 will be described. A steering column 32 is disposed forward of the cockpit seat 8 in the cabin 7. The steering column 32 stands while being buried on the rear surface of a dashboard 33 disposed on the front surface side in the cabin 7. The steering wheel 9 having a substantially circular shape in plan view is attached to the upper end of a steering shaft 9a projecting upward from the upper surface of the steering column 32. A steering angle sensor 821 for detecting a steering angle of the steering wheel 9 is buried near the lower end of the steering shaft 9a under a floor plate 40.

A brake pedal 35 for braking the traveling body 2 is disposed at the right of the steering column 32. A forward-reverse switching lever 36 (reverser lever) for switching the traveling direction of the traveling body 2 between forward and reverse and a clutch pedal 37 for disengaging a clutch for engaging/disengaging a driving force (not shown) are disposed at the left of the steering column 32. A parking brake lever 43 for holding the brake pedal 35 at a pressed position is disposed at the rear of the steering column 32.

A misoperation preventing member 38 (reverser guard) extending along the forward-reverse switching lever 36 is disposed at the left of the steering column 32 below the forward-reverse switching lever 36. The misoperation preventing member 38 as a contact preventing member, which is disposed below the forward-reverse switching lever 36, can prevent an accidental contact of an operator with the forward-reverse switching lever 36 when the operator takes on or off the tractor 1. An operation display board 39 incorporating a liquid crystal panel is disposed on an upper portion of the rear surface of the dashboard 33.

An accelerator pedal 41 for controlling the rotation speed of the engine 5 or the vehicle speed, for example, is disposed at the right of the steering column 32 on the floor plate 40 forward of the cockpit seat 8 in the cabin 7. The substantially entire upper surface of the floor plate 40 is flat. Side columns 42 are disposed at the left and right sides of the cockpit seat 8. An ultra-low speed lever 44 (creep lever) for forcibly and largely reducing the traveling speed (vehicle speed) of the tractor 1, a sub-transmission lever 45 for switching an output range of a traveling sub-transmission gear mechanism in the straight-traveling transmission case 17, and a PTO transmission lever 46 for performing a switching operation on the driving speed of the PTO shaft 25 are disposed between the cockpit seat 8 and the left side column 42.

An arm rest 49 on which an arm or an elbow of the operator seated on the cockpit seat 8 is disposed between the cockpit seat 8 and the right side column 42. The arm rest 49 is provided separately from the cockpit seat 8, and includes a main transmission lever 50 for increasing and decreasing the traveling speed of the tractor 1 and a work unit position dial 51 (lifting and lowering dial) that is a dial with which the height position of the ground work machine such as a rotary tiller is manually adjusted. The arm rest 49 is configured to be pivotable about a lower portion of the rear end thereof to be raised in a plurality of stages. In the embodiment, when the main transmission lever 50 is tilted forward, the vehicle speed of the traveling body 2 increases. On the other hand, when the main transmission lever 50 is tilted rearward, the vehicle speed of the traveling body 2 decreases. The arm rest 49 further includes a main transmission sensor 822 (see FIG. 13) of a potentiometer (variable resistor) type that detects a forward or rearward tilt of the main transmission lever 50.

The operating monitor 55 having a touch panel function and enabling an instruction operation to each part of the tractor 1, a throttle lever 52 that holds the setting of the rotation speed of the engine 5, a PTO clutch switch 53 that engages and disengages power transmission from the PTO shaft 25 to the work machine such as a rotary tiller, and a plurality of hydraulic operation levers 54 (SCV levers) for switching a hydraulic pressure output valve (not shown) disposed on the upper surface of the straight-traveling transmission case 17 are arranged in this order from the front on the right side column 42. Here, the hydraulic pressure output valve is used for controlling supply of hydraulic oil to hydraulic pressure equipment of another work machine, such as a front loader retrofitted to the tractor 1.

Then, with reference mainly to FIGS. 3, 4, and 8 through 10, internal configurations of the straight-traveling transmission case 17 and the turning transmission case 13 and a power transmission system of the tractor 1 will be described. A front chamber of the straight-traveling transmission case 17 houses a hydraulic mechanical stepless transmission 500 for straight-traveling, a mechanical creep transmission gear mechanism 502 and a mechanical traveling sub-transmission gear mechanism 503. The creep transmission gear mechanism 502 and the traveling sub-transmission gear mechanism 503 shift the speed of the rotative force transmitted by way of a forward-reverse switching mechanism 501 described later. An intermediate chamber of the straight-traveling transmission case 17 houses the forward-reverse switching mechanism 501 that switches the rotative force from the hydraulic mechanical stepless transmission 500 to a forward direction or a reverse direction. A rear chamber of the straight-traveling transmission case 17 houses a PTO transmission mechanism 505 that appropriately shifts the speed of the rotative force from the engine 5 and transmits the power to the PTO shaft 25. The creep transmission gear mechanism 502 and the traveling sub-transmission gear mechanism 503 correspond to a traveling transmission gear mechanism that achieves multistage shifting of the shifted output from the forward-reverse switching mechanism 501. A pump case 480 housing a work machine hydraulic pump 481 and a traveling hydraulic pump 482 that are driven by the rotative force of the engine 5 is attached to a front portion of the right outer surface of the straight-traveling transmission case 17.

The flywheel 26 is directly coupled to the output shaft 5a of the engine 5 projecting rearward from the rear side surface of the engine 5. The input counter shaft 28 projecting forward from the front surface of the straight-traveling transmission case 17 is coupled to the main driving shaft 27 projecting rearward from the flywheel 26 through the driving force transmission shaft 29 including universal joints on both ends thereof. The rotative force of the engine 5 is transmitted to the input counter shaft 28 of the straight-traveling transmission case 17 through the main driving shaft 27 and the driving force transmission shaft 29, and appropriately subjected to speed change by the hydraulic mechanical stepless transmission 500 and the creep transmission gear mechanism 502 or the traveling sub-transmission gear mechanism 503. The shifted driving force from the creep transmission gear mechanism 502 and the traveling sub-transmission gear mechanism 503 is transmitted to a traveling gear mechanism 507 in the turning transmission case 13 through the straight-traveling output shaft 30, the driving force transmission shaft 31, and the straight-traveling input counter shaft 508.

The straight-traveling hydraulic mechanical stepless transmission (HMT) 500 is an inline transmission in which the main transmission output shaft 512 is disposed concentrically with the main transmission input shaft 511, and a hydraulic pump unit 521, a cylinder block, a hydraulic motor unit 522 are arranged in series. A main transmission input gear 513 is fitted onto the rear end of the input counter shaft 28 to be relatively non-rotatable. An input transmission gear 514 constantly meshing with the main transmission input gear 513 is fixed to the rear end of the main transmission input shaft 511. Thus, a rotative force of the input counter shaft 28 is transmitted to the hydraulic mechanical stepless transmission 500 through the main transmission input gear 513, the input transmission gear 514, and the main transmission input shaft 511. A main transmission high-speed gear 516, a main transmission reverse gear 517, and a main transmission low-speed gear 515, for traveling output, are fitted onto the main transmission output shaft 512 to be relatively non-rotatable. An input side of the main transmission input shaft 511 and an output side of the main transmission output shaft 512 are located on the same side (each located rearward of the hydraulic mechanical stepless transmission 500).

The hydraulic mechanical stepless transmission 500 includes a variable capacity hydraulic pump unit 521 and a fixed capacity hydraulic motor unit 522 that is operated by high-pressure hydraulic oil discharged from the hydraulic pump unit 521. The hydraulic pump unit 521 includes a pump swash plate 523 whose tilt angle is changeable relative to the axis of the main transmission input shaft 511 so as to adjust a supply rate of hydraulic oil. A main transmission hydraulic cylinder 524 is cooperatively coupled to the pump swash plate 523 to adjust the tilt angle of the pump swash plate 523 relative to the axis of the main transmission input shaft 511. In the embodiment, the main transmission hydraulic cylinder 524 is assembled to the hydraulic mechanical stepless transmission 500 to be a unit as a single member.

When the main transmission hydraulic cylinder 524 is driven in proportion to the amount of operation of the main transmission lever 50, the tilt angle of the pump swash plate 523 relative to the axis of the main transmission input shaft 511 is changed accordingly. The angle of the pump swash plate 523 according to the embodiment can be adjusted within a range between a maximum tilt angle on one side (positive) and a maximum tilt angle on the other side (negative) with respect to a neutral angle at which the tilt angle is substantially zero (±several degrees with respect to zero). When the vehicle speed of the traveling body 2 is lowest, the pump swash plate 523 is tilted to one of the sides (a tilt angle close to the maximum negative angle in this case).

While the tilt angle of the pump swash plate 523 is substantially zero (neutral angle), the hydraulic pump unit 521 does not cause pressing or pulling of the group of input-side plungers. The cylinder block rotates in the same direction at substantially the same speed as the main transmission input shaft 511, but because no hydraulic oil is supplied from the hydraulic pump unit 521, the group of output-side plungers of the cylinder block, and further the hydraulic motor unit 522, are not driven so that the main transmission output shaft 512 rotates at substantially the same rotation speed as the main transmission input shaft 511.

When the pump swash plate 523 is tilted to one direction (that may be referred to as at a positive tilt angle or a normal tilt angle) relative to the axis of the main transmission input shaft 511, the hydraulic pump unit 521 pushes and pulls the group of input-side plungers to supply hydraulic oil to the hydraulic motor unit 522 so that the hydraulic motor unit 522 is caused to rotate in the same direction as the main transmission input shaft 511 through the group of output-side plungers of the cylinder block. At this time, since the cylinder block rotates in the same direction at substantially the same rotation speed as the main transmission input shaft 511, the main transmission output shaft 512 rotates at a rotation speed higher than the main transmission input shaft 511. That is, the sum of the rotation speed of the main transmission input shaft 511 (that may be referred to as the rotation speed of the cylinder block) and the rotation speed of the hydraulic motor unit 522 is transmitted to the main transmission output shaft 512. As a result, the shifted driving force of the main transmission output shaft 512 changes in proportion to the tilt angle (that may be referred to a positive tilt angle or a normal tilt angle) of the pump swash plate 523 in a rotation speed range higher than the rotation speed of the main transmission input shaft 511. When the tilt angle of the pump swash plate 523 is close to the maximum positive value, the main transmission output shaft 512 rotates at high speed, but the traveling body 2 travels at an intermediate speed right in the middle between the lowest speed (substantially zero) and the highest speed (see an outline square mark in FIG. 11).

When the pump swash plate 523 is tilted to the other direction (that may be referred to as at a negative tilt angle or a reverse tilt angle) relative to the axis of the main transmission input shaft 511, the hydraulic pump unit 521 pushes and pulls the group of input-side plungers to supply hydraulic oil to the hydraulic motor unit 522 so that the hydraulic motor unit 522 is caused to rotate in the opposite direction to the main transmission input shaft 511 through the group of output-side plungers of the cylinder block. At this time, since the cylinder block rotates in the same direction at substantially the same rotation speed as the main transmission input shaft 511, the main transmission output shaft 512 rotates at a rotation speed lower than the main transmission input shaft 511. That is, a result of subtracting the rotation speed of the hydraulic motor unit 522 from the rotation speed of the main transmission input shaft 511 (that may be referred to as the rotation speed of the cylinder block) is transmitted to the main transmission output shaft 512. As a result, the shifted driving force of the main transmission output shaft 512 changes in proportion to the tilt angle (that may be referred to a negative tilt angle or a reverse tilt angle) of the pump swash plate 523 in a rotation speed range lower than the rotation speed of the main transmission input shaft 511. When the tilt angle of the pump swash plate 523 is negative and close to the maximum tilt angle, the main transmission output shaft 512 rotates at the lowest speed (substantially zero) (see an outline circle mark in FIG. 11). In the embodiment, the traveling body 2 is configured to travel at the lowest speed (substantially zero) or at the highest speed when the tilt angle of the pump swash plate 523 is negative and close to the maximum tilt angle, which will be specifically described later.

A pump driving gear 484 is fitted onto a pump driving shaft 483 to be relatively non-rotatable. The pump driving shaft 483 is used for driving both the work machine and traveling hydraulic pumps 481 and 482. The pump driving gear 484 is coupled to the main transmission input gear 513 of the input counter shaft 28 through a spur gear mechanism 485 to enable power transmission. The straight-traveling transmission case 17 includes a lubricating oil pump 518 for supplying hydraulic oil for lubrication to the hydraulic mechanical stepless transmission 500 and the forward-reverse switching mechanism 501, for example. A pump gear 520 fixed to a pump shaft 519 of the lubricating oil pump 518 constantly mashes with an input transmission gear 514 of the main transmission input shaft 511. Accordingly, the work machine and traveling hydraulic pumps 481 and 482 and the lubricating oil pump 518 are driven by the rotative force of the engine 5.

A mechanism for switching between forward and reverse that is executed through the forward-reverse switching mechanism 501 will now be described. A planetary gear mechanism 526 as a forward high-speed gear mechanism and a low-speed gear pair 525 as a forward low-speed gear mechanism are disposed on a lower portion of the input counter shaft 28. The planetary gear mechanism 526 includes: a sun gear 531 that integrally rotates with an input side transmission gear 529 rotatably supported on the input counter shaft 28; a carrier 532 rotatably supporting a plurality of planetary gears 533 on the same radius; and a ring gear 534 having an inner circumferential surface provided with internal teeth. The sun gear 531 and the ring gear 534 are rotatably fitted onto the input counter shaft 28. The carrier 532 is fitted onto the input counter shaft 28 to be relatively non-rotatable. The sun gear 531 meshes with the planetary gears 533 of the carrier 532 from the radially inner side. The internal teeth of the ring gear 534 mesh with the planetary gears 533 from the radially outer side. The input counter shaft 28 rotatably supports an output-side transmission gear 530 that rotates integrally with the ring gear 534. An input-side low-speed gear 527 and an output-side low-speed gear 528 constituting the low-speed gear pair 525 have an integrated structure, and are rotatably supported on a portion of the input counter shaft 28 between the planetary gear mechanism 526 and the main transmission input gear 513.

The straight-traveling transmission case 17 houses the input counter shaft 28, a traveling relay shaft 535, and a traveling transmission shaft 536. The traveling relay shaft 535 and the traveling transmission shaft 536 extend in parallel with the main transmission input shaft 511 and the main transmission output shaft 512. The forward-reverse switching mechanism 501 is disposed on the traveling relay shaft 535 as a transmission shaft. That is, a forward high-speed gear 540 coupled by a multiplate wet forward high-speed hydraulic clutch 539, a reverse-traveling gear 542 coupled by a multiplate wet reverse hydraulic clutch 541, and a forward low-speed gear 538 coupled by a multiplate wet forward low-speed hydraulic clutch 537 are fitted onto the traveling relay shaft 535. A traveling relay gear 543 is fitted onto a portion of the traveling relay shaft 535 between the forward high-speed hydraulic clutch 539 and the reverse-traveling gear 542 to be relatively non-rotatable. A traveling transmission gear 544 constantly meshing with the traveling relay gear 543 is fitted onto the traveling transmission shaft 536 to be relatively non-rotatable. The main transmission low-speed gear 515 of the main transmission output shaft 512 constantly meshes with the input-side low-speed gear 527 of the low-speed gear pair 525 on the input counter shaft 28, and the output-side low-speed gear 528 constantly meshes with the forward low-speed gear 538. The main transmission high-speed gear 516 of the main transmission output shaft 512 constantly meshes with the input-side transmission gear 529 of the planetary gear mechanism 526 on the input counter shaft 28, and the output-side transmission gear 530 constantly meshes with the forward high-speed gear 540. The main transmission reverse gear 517 of the main transmission output shaft 512 constantly meshes with the reverse-traveling gear 542.

When the forward-reverse switching lever 36 is operated to the forward side, the forward low-speed hydraulic clutch 537 or the forward high-speed hydraulic clutch 539 comes to be in a driving force connected state, and the forward low-speed gear 538 or the forward high-speed gear 540 is coupled to the traveling relay shaft 535 to be relatively non-rotatable. As a result, a forward low-speed or forward high-speed rotative force is transmitted from the main transmission output shaft 512 to the traveling relay shaft 535 through the low-speed gear pair 525 or the planetary gear mechanism 526, and thereby, the driving force is transmitted from the traveling relay shaft 535 to the traveling transmission shaft 536. When the forward-reverse switching lever 36 is operated to the rearward side, the reverse hydraulic clutch 541 comes to be in a driving force connected state, and the reverse-traveling gear 542 is coupled to the traveling relay shaft 535 to be relatively non-rotatable. As a result, a reverse-traveling rotative force is transmitted from the main transmission output shaft 512 to the traveling relay shaft 535 through the main transmission reverse gear 517 and the reverse-traveling gear 542, and thus, the driving force is transmitted from the traveling relay shaft 535 to the traveling transmission shaft 536.

Which one of the forward low-speed hydraulic clutch 537 and the forward high-speed hydraulic clutch 539 comes to be in the driving force connected state by the forward operation of the forward-reverse switching lever 36 is determined depending on the amount of operation of the main transmission lever 50. While the forward-reverse switching lever 36 is in a neutral position, all the hydraulic clutches 537, 539, and 541 are in driving force disconnected states, and a traveling driving force from the main transmission output shaft 512 is substantially zero (in a main clutch disengaged state).

Figure 11:
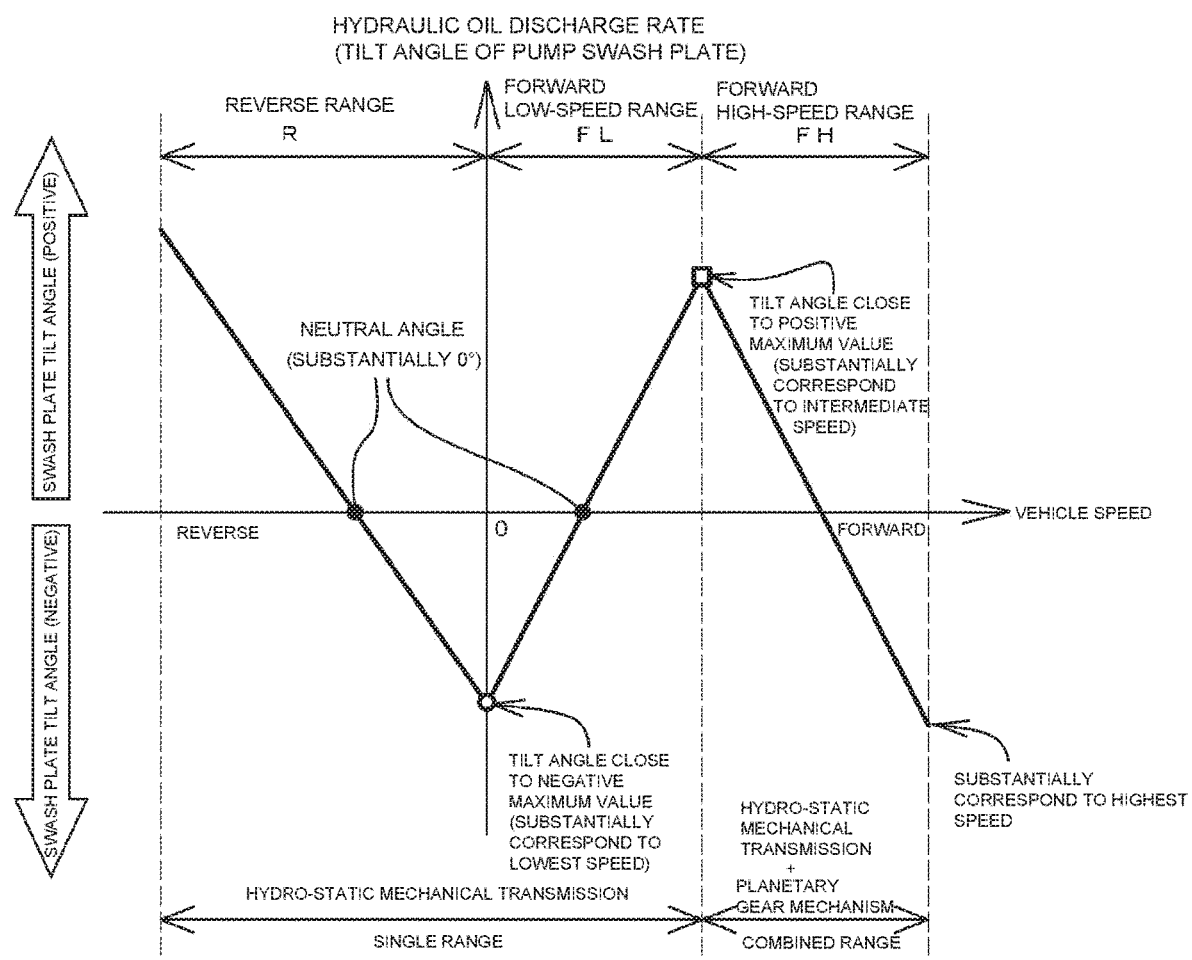

Here, FIG. 11 shows a relationship between the discharge rate of hydraulic oil (tilt angle of the pump swash plate 523) of the hydraulic mechanical stepless transmission 500 and the vehicle speed of the tractor 1. In the embodiment, in a case where a neutral operation is performed on the main transmission lever 50 irrespectively of the operating state of the forward-reverse switching lever 36, driving of the main transmission hydraulic cylinder 524 causes the pump swash plate 523 to be tilted at a negative tilt angle close to the maximum (reverse tilt angle) (see an outline circle mark) and the main transmission output shaft 512 and the traveling relay shaft 535 to rotate at lowest rotation speeds (substantially zero). Consequently, the vehicle speed of the tractor 1 becomes substantially zero.

In a case where the main transmission lever 50 is operated toward an accelerating side from neutral to an approximately intermediate speed with the forward-reverse switching lever 36 operated toward the forward traveling side, the main transmission hydraulic cylinder 524 is driven in such a manner that the tilt angle of the pump swash plate 523 changes from an approximately maximum negative tilt angle (reverse tilt angle) to zero and to an approximately maximum positive tilt angle (normal tilt angle) (see the outline square mark) so that the shifted driving force from the hydraulic motor unit 522 to the main transmission output shaft 512 is accelerated from substantially zero to a high speed. At this time, the forward low-speed hydraulic clutch 537 changes to the driving force connected state, and the forward low-speed gear 538 or the forward high-speed gear 540 is coupled to the traveling relay shaft 535 to be relatively non-rotatable. As a result, a forward low-speed rotative force is transmitted from the main transmission output shaft 512 to the traveling relay shaft 535 through the low-speed gear pair 525. Accordingly, a driving force for acceleration is transmitted to the main transmission output shaft 512 so that the traveling relay shaft 535 changes from a lowest rotation speed state to a forward intermediate rotation speed state (see a forward low-speed range FL). Then, the driving force is transmitted from the traveling relay shaft 535 to the traveling transmission shaft 536.

In a case where the main transmission lever 50 is operated toward the accelerating side from the intermediate speed to an approximately highest speed with the forward-reverse switching lever 36 operated toward the forward traveling side, the main transmission hydraulic cylinder 524 is driven in such a manner that the tilt angle of the pump swash plate 523 changes from an approximately maximum positive tilt angle (normal tilt angle) to zero and to an approximately maximum negative tilt angle (reverse tilt angle) so that the shifted driving force from the hydraulic motor unit 522 to the main transmission output shaft 512 decreases from a high speed to substantially zero. At this time, the forward high-speed hydraulic clutch 539 changes to the driving force connected state, and the forward high-speed gear 540 is coupled to the traveling relay shaft 535 to be relatively non-rotatable. As a result, a forward high-speed rotative force is transmitted from the main transmission output shaft 512 to the traveling relay shaft 535 through the planetary gear mechanism 526. That is, in the planetary gear mechanism 526, the driving force from the engine 5 and the decelerating driving force to the main transmission output shaft 512 are combined, and then, the resultant combined driving force causes the traveling relay shaft 535 to change from the forward intermediate rotation speed state to a forward highest rotation speed state (see forward high-speed range FH). Then, the driving force is transmitted from the traveling relay shaft 535 to the traveling transmission shaft 536. The traveling body 2 travels at the highest speed.

In a case where the main transmission lever 50 is operated from neutral toward an accelerating side with the forward-reverse switching lever 36 operated toward the reverse traveling side, the main transmission hydraulic cylinder 524 is driven in such a manner that the tilt angle of the pump swash plate 523 changes from an approximately maximum negative tilt angle (reverse tilt angle) to zero and to an approximately maximum positive tilt angle (normal tilt angle), and the shifted driving force from the hydraulic motor unit 522 to the main transmission output shaft 512 is accelerated from substantially zero to a high speed. At this time, the reverse hydraulic clutch 541 changes to the driving force connected state, and the reverse-traveling gear 542 is coupled to the traveling relay shaft 535 to be relatively non-rotatable. As a result, a reverse-traveling rotative force is transmitted from the main transmission output shaft 512 to the traveling relay shaft 535 through the main transmission reverse gear 517 and the reverse-traveling gear 542. Accordingly, the driving force for acceleration is transmitted to the main transmission output shaft 512 so that the traveling relay shaft 535 changes from the lowest rotation speed state to a reverse high rotation speed state (reverse range R). Then, the driving force is transmitted from the traveling relay shaft 535 to the traveling transmission shaft 536.

In the embodiment, the swash plate tilt angle of the hydraulic pump unit 521 is changed from the normal tilt angle to zero and then to the reverse tilt angle so that the shifted driving force to the main transmission output shaft 512 is decelerated from a high speed to zero. In the planetary gear mechanism 526, the driving force from the engine 5 and the driving force for decelerating the main transmission output shaft 512 are combined, and the resulting combined driving force causes the transmission shaft 535 to change from the forward intermediate rotation speed state to the forward highest rotation speed state. Thus, an increase of the shiftable range by using the planetary gear mechanism 526 can be ensured without an increase in the capacity of the hydraulic mechanical stepless transmission 500. Accordingly, a higher output of the straight-traveling transmission case 17 can be achieved with a higher efficiency, lighter weight, and lower cost of the hydraulic mechanical stepless transmission 500 guaranteed.

In addition, in the embodiment, the tilt angle of the swash plate of the hydraulic pump unit 521 is changed from the reverse tilt angle to zero and then to the normal tilt angle so that the shifted driving force to the main transmission output shaft 512 is accelerated from zero to a high speed. The driving force for accelerating the main transmission output shaft 512 causes the transmission shaft 535 to change from the lowest rotation speed state to the forward intermediate rotation speed state. Thus, an output torque for causing the zero start of the tractor 1 from a state where the initial speed is zero can be obtained without fail. In view of this, creeping speed performance of the tractor 1 can be improved with a higher output of the straight-traveling transmission case 17 while higher efficiency, lighter weight, and lower cost of the hydraulic mechanical stepless transmission 500 are achieved.

Next, description will be given on a structure for switching among ultra-low speed, low speed, and high speed to be performed with the creep transmission gear mechanism 502 and the traveling sub-transmission gear mechanism 503 that are traveling transmission gear mechanisms. The straight-traveling transmission case 17 houses the mechanical creep transmission gear mechanism 502, the mechanical traveling sub-transmission gear mechanism 503, a traveling counter shaft 545 extending coaxially with the traveling transmission shaft 536, and a sub-transmission shaft 546 extending in parallel with the traveling counter shaft 545. The creep transmission gear mechanism 502 and the traveling sub-transmission gear mechanism 503 shift the speed of the rotative force transmitted by way of a forward-reverse switching mechanism 501.

A transmission gear 547 and a creep gear 548 are disposed on a rear portion of the traveling counter shaft 545. The transmission gear 547 is rotatably fitted onto the traveling counter shaft 545, and coupled to the traveling transmission shaft 536 so that the transmission gear 547 rotates integrally with the traveling transmission shaft 536. The creep gear 548 is fitted onto the traveling counter shaft 545 to be relatively non-rotatable. A creep shifter 549 is spline-fitted to a portion of the traveling counter shaft 545 between the transmission gear 547 and the creep gear 548 to be relatively non-rotatable and slidable in the axial direction. When the ultra-low speed lever 44 is operated to turn on or off, the creep shifter 549 slides in such a manner that the transmission gear 547 or the creep gear 548 is selectively coupled to the traveling counter shaft 545. A deceleration gear pair 550 is rotatably fitted onto a portion of the sub-transmission shaft 546 inside the front chamber. An input-side deceleration gear 551 and an output-side deceleration gear 552 constituting the deceleration gear pair 550 have an integrated structure. The transmission gear 547 of the traveling counter shaft 545 constantly meshes with the input-side deceleration gear 551 of the sub-transmission shaft 546. The creep gear 548 constantly meshes with the output-side deceleration gear 552.

A low-speed relay gear 553 and a high-speed relay gear 554 are disposed on a front portion of the traveling counter shaft 545. The low-speed relay gear 553 is fixed to the traveling counter shaft 545. The high-speed relay gear 554 is fitted onto the traveling counter shaft 545 to be relatively non-rotatable. A low-speed gear 555 that meshes with the low-speed relay gear 553 and a high-speed gear 556 that meshes with the high-speed relay gear 554 are rotatably fitted onto a portion of the sub-transmission shaft 546 forward of the deceleration gear pair 550. A sub-transmission shifter 557 is spline-fitted to a portion of the sub-transmission shaft 546 between the low-speed gear 555 and the high-speed gear 556 to be relatively non-rotatable and slidable along the axial direction. When the sub-transmission lever 45 is operated, the sub-transmission shifter 557 slides, and the low-speed gear 555 or the high-speed gear 556 is selectively coupled to the sub-transmission shaft 546.

In addition, a straight-traveling relay shaft 568 and a straight-traveling output shaft 30 are disposed to extend in parallel with the traveling counter shaft 545 and the sub-transmission shaft 546. A driven gear 570 fitted onto the straight-traveling relay shaft 568 to be relatively non-rotatable constantly meshes with a driving gear 83 fitted onto the front end of the sub-transmission shaft 546 to be relatively non-rotatable. A straight-traveling output gear 583 fitted onto the straight-traveling output shaft 30 to be relatively non-rotatable constantly meshes with a straight-traveling relay gear 582 fitted onto the front end of the straight-traveling relay shaft 568 to be relatively non-rotatable.

The driving gear 569 on the sub-transmission shaft 546, the driven gear 570 and the straight-traveling relay gear 572 on the straight-traveling relay shaft 568, and the straight-traveling output gear 573 on the straight-traveling output shaft 30 constitute a straight-traveling output gear mechanism for driving-force transmission of rotation of the sub-transmission shaft 456 to the straight-traveling output shaft 30. The straight-traveling output gear mechanism includes a straight-traveling pickup rotation sensor (straight-traveling vehicle speed sensor) 823, and the straight-traveling pickup rotation sensor 823 detects the number of rotations of the straight-traveling output (straight-traveling vehicle speed). For example, straight-traveling relay gear 582 and the straight-traveling pickup rotation sensor 823 are disposed to be opposed to each other so that the number of rotations of the straight-traveling output (straight vehicle speed) can be detected based on the number of rotations of the straight-traveling relay gear 582.

In the embodiment, when the ultra-low speed lever 44 is operated to turn on and the sub-transmission lever 45 is operated to a low-speed side, the creep gear 548 is coupled to the traveling counter shaft 545 to be relatively non-rotatable, and the low-speed gear 555 is coupled to the sub-transmission shaft 546 to be relatively non-rotatable. Thus, an ultra-low speed traveling driving force is output from the straight-traveling output shaft 30 toward the turning transmission case 13 through the traveling transmission shaft 536, the traveling counter shaft 545, the sub-transmission shaft 546, and then the straight-traveling relay shaft 568. The ultra-low speed lever 44 and the sub-transmission lever 45 are cooperatively coupled to each other through a transmission restraining member (described in detail later) so as to inhibit performing both a high-speed side operation on the sub-transmission lever 45 and a turning-on operation on the ultra-low speed lever 44. That is in a state where the ultra-low speed lever 44 is turned on, the sub-transmission lever 45 cannot be operated to a high-speed side, whereas in a state where the sub-transmission lever 45 is operated to a high-speed side, the ultra-low speed lever 44 cannot be turned on.

When the ultra-low speed lever 44 is operated to turn off and the sub-transmission lever 45 is operated to the low-speed side, the transmission gear 547 is coupled to the traveling counter shaft 545 to be relatively non-rotatable, and the low-speed gear 555 is coupled to the sub-transmission shaft 546 to be relatively non-rotatable. Thus, an ultra-low speed traveling driving force is output from the straight-traveling output shaft 30 toward the turning transmission case 13 through the traveling transmission shaft 536, the traveling counter shaft 545, the sub-transmission shaft 546, and then the straight-traveling relay shaft 568, for example. When the ultra-low speed lever 44 is operated to turn off and the sub-transmission lever 45 is operated to the high-speed side, the transmission gear 547 is coupled to the traveling counter shaft 545 to be relatively non-rotatable, and the high-speed gear 556 is coupled to the sub-transmission shaft 546 to be relatively non-rotatable. Thus, a high speed traveling driving force is output from the straight-traveling output shaft 30 toward the turning transmission case 13 through the traveling transmission shaft 536, the traveling counter shaft 545, the sub-transmission shaft 546, and then the straight-traveling relay shaft 568.

The driving force transmission shaft 31 couples the straight-traveling input counter shaft 508 projecting rearward from the turning transmission case 13 and the straight-traveling output shaft 30 projecting forward from a lower portion of the front surface of the straight-traveling transmission case 17 to each other. The turning transmission case 13 includes: a turning hydraulic stepless transmission (HST) 701 for appropriately shifting the speed of the rotative force from the engine 5; a differential gear mechanism 702 for transmitting output rotation from the hydraulic stepless transmission 701 to the left and right traveling crawlers 3 (drive sprockets 62); and a pair of left and light planetary gear mechanisms 703 for combining a rotative force from the differential gear mechanism 702 and a rotative force from the straight-traveling transmission case 17.

In the hydraulic stepless transmission 701, a hydraulic pump unit 704 and a hydraulic motor unit 705 as a pair are arranged in parallel, and hydraulic oil is appropriately fed from the hydraulic pump unit 704 to the hydraulic motor unit 705 by a driving force transmitted to the pump shaft 706. A charge pump 707 for supplying hydraulic oil to the hydraulic pump unit 704 and the hydraulic motor unit 705 is attached to the pump shaft 706. The hydraulic stepless transmission 701 appropriately changes the tilt angle of the pump swash plate 708 in the hydraulic pump unit 704 to change the direction and amount of discharge of hydraulic oil to the hydraulic motor unit 705 and thereby to adjust the rotation direction and the number of rotations of a motor shaft 709 projecting from the hydraulic motor unit 705 to any values.

In the turning transmission case 13, the turning input counter shaft 712 is disposed in parallel with the pump shaft 706 of the hydraulic pump unit 704, and the turning input gear 713 is fitted onto the turning input counter shaft 712 to be relatively non-rotatable. The turning relay shaft 714 is disposed in parallel with the turning input counter shaft 712 and the pump shaft 706 between the turning input counter shaft 712 and the pump shaft 706, and the turning relay gear 715 constantly meshing with the turning input gear 713 is fitted onto the turning relay shaft 714 to be relatively non-rotatable. A pump input gear 710 constantly meshing with the turning relay gear 715 is fitted onto the pump shaft 706 to be relatively non-rotatable so that the rotative force transmitted from the engine 5 to the turning input counter shaft 712 is transmitted to the pump shaft 706 through the turning relay shaft 714.

In the turning transmission case 13, the differential gear mechanism 702 is constituted by a bevel gear mechanism in which a pair of left and right side gears 717 mesh with both sides of a pinion 716 fitted onto the rear end of the motor shaft 709 to be relatively non-rotatable. In the differential gear mechanism 702, a pair of left and right turning output shafts 718 onto which the side gears 717 are fitted to be relatively non-rotatable at one ends extend laterally sideways. A turning output gear 719 for transmitting a driving force to the pair of left and right planetary gear mechanisms 703 is fitted onto each of the other ends of a pair of left and right turning output shafts 718 to be relatively non-rotatable.

A rotative force (turning rotative force) from the hydraulic motor unit 705 output from the motor shaft 709 is branched by the differential gear mechanism 702 to be forward-reverse rotative forces, and transmitted to the pair of left and right planetary gear mechanisms 703 through the pair of left and right turning output shafts 718. That is, in the differential gear mechanism 702, the rotative force is transmitted as a reverse rotative force to the left planetary gear mechanism 703 through the left turning output shaft 718 onto which the left side gear 717 is fitted, whereas the rotative force is transmitted as a forward rotative force to the right planetary gear mechanism 703 through the right turning output shaft 718 onto which the right side gear 717 is fitted.

The hydraulic motor unit 705 of the hydraulic stepless transmission 701 is provided with a turning pickup rotation sensor (turning vehicle-speed sensor) 824, and the turning pickup rotation sensor 824 detects the number of rotations of a turning output (turning vehicle speed). For example, a turning pulse generating rotating wheel member is provided on the motor shaft 709, a turning pickup rotation sensor 824 is disposed to be opposed to the turning pulse generating rotating wheel member, and based on the number of rotations of the turning pulse generating rotating wheel member, the number of rotations of a straight-traveling output (turning vehicle speed) is detected.

In the turning transmission case 13, a brake mechanism 751 coupled to the brake pedal 35 though a brake link member 750 is disposed on the straight-traveling input counter shaft 508 to which a rotative force is transmitted from the straight-traveling transmission case 17. A straight-traveling input gear 720 is fitted onto the front end of the straight-traveling input counter shaft 508 to be relatively non-rotatable. The straight-traveling relay shaft 721 is disposed in parallel with the straight-traveling input counter shaft 508, and a straight-traveling relay gear 722 constantly meshing with the straight-traveling input gear 720 is fitted onto the straight-traveling relay shaft 721 to be relatively non-rotatable.

A bevel gear mechanism in which a ring gear 724 meshes with a pinion 723 fitted onto the rear end of the straight-traveling relay shaft 721 to be relatively non-rotatable is provided, and the ring gear 724 is fitted onto the laterally extending straight-traveling output shaft 725 to be relatively non-rotatable. Each of both ends of the straight-traveling output shaft 725 is coupled to the pair of left and right planetary gear mechanisms 703. The rotative force (straight-traveling rotative force) from the straight-traveling transmission case 17 to be input to the straight-traveling input counter shaft 508 is transmitted to the pair of left and right planetary gear mechanisms 703 through the straight-traveling output shaft 725. When the brake mechanism 751 performs a brake operation in accordance with an operation on the brake pedal 35, a rotative force of the straight-traveling output shaft 725 is attenuated or stopped.

Each of the left and right planetary gear mechanisms 703 includes one sun gear 726, a plurality of planetary gears 727 that mesh with the sun gear 726, a ring gear 728 that meshes with the turning output gear 719, and a carrier 729 for causing the planetary gears 727 to be rotatable on the same circumference. The carriers 729 of the left and right planetary gear mechanisms 703 are opposed to each other with an interval on the same axis. The left and right sun gears 726 are fixed to both ends of the straight-traveling output shaft 725 having an intermediate portion onto which the ring gear 724 is fitted.

Each of the left and right ring gears 728 is rotatably fitted onto the straight-traveling output shaft 725, and external teeth on the outer peripheral surface mesh with the left and right turning output gears 719 to be thereby coupled to the turning output shafts 718. The carriers 729 fixed to the ring gears 728 rotatably and pivotally support the planetary gears 727. Each of the left and right carriers 729 is rotatably fitted onto a corresponding one of the left and right differential output shafts 730. Each of the left and right output-side transmission gears 731 that integrally rotate with the left and right planetary gears 727 meshes with a corresponding one of the left and right differential input gears 732 that are fitted onto the left and right differential output shafts 730 to be relatively non-rotatable. The left and right differential output shafts 730 are coupled to left and right relay shafts 735 through relay gears 733 and 734, and the left and right relay shafts 735 are coupled to the left and right vehicle shafts 16 through final gears 736 and 737.

Each of the left and right planetary gear mechanisms 703 receives the rotative force from the straight-traveling transmission case 17 through the straight-traveling relay shaft 721 and the straight-traveling output shaft 725 to cause the sun gear 726 to rotate in the same direction at the same number of rotations. That is, the left and right sun gears 726 receives the rotative force from the straight-traveling transmission case 17 as straight-traveling rotation, and transfers the received force to the differential output shafts 730 through the planetary gears 727 and the output-side transmission gears 731. Thus, the rotative force transmitted from the straight-traveling transmission case 17 to the left and right planetary gear mechanisms 703 is transmitted from the left and right vehicle shafts 16 to the drive sprockets 62 in the same direction with the same number of rotations, and the left and right traveling crawlers 3 are driven in the same direction with the same number of rotations so that the traveling body 2 is caused to move straight (forward or reverse).

On the other hand, the left and right planetary gear mechanisms 703 receives a rotative force from the hydraulic motor unit 705 through the differential gear mechanism 702 and the turning output shafts 718 to cause the ring gears 728 to rotate with the same number of rotations in opposite directions. That is, the left and right ring gears 728 receive rotative forces from the hydraulic motor unit 705 as turning rotations, the carrier 729 superimposes the turning rotation on the straight-traveling rotation from the sun gear 726, and rotates the planetary gears 727 and the output-side transmission gears 731. In this manner, a rotative force obtained by adding the turning rotation to the straight-traveling rotation is transmitted to one of the left and right differential output shafts 730 through the planetary gears 727 and the output-side transmission gears 731, whereas a rotative force obtained by subtracting the turning rotation from the straight-traveling rotation is transmitted to the other one of the left and right differential output shafts 730 through the planetary gears 727 and the output-side transmission gears 731.

Shifted outputs from the straight-traveling input counter shaft 508 and the motor shaft 709 are transmitted to the drive sprockets 62 of the left and right traveling crawlers 3 by way of the left and right planetary gear mechanisms 703, and the vehicle speed (traveling speed) and the traveling direction of the traveling body 2 are determined. That is, when the rotative force from the straight-traveling transmission case 17 is input to the straight-traveling input counter shaft 508 in a state where the hydraulic motor unit 705 of the hydraulic stepless transmission 701 is stopped and the left and right ring gears 728 are made stationary and fixed, rotation of the straight-traveling input counter shaft 508 is transmitted to the left and right sun gears 726 with the same number of rotations at the left and right, and the left and right traveling crawlers 3 are driven in the same direction with the same number of rotations so that the traveling body 2 travels straight.

On the other hand, in a case where rotation by the straight-traveling output shaft 30 of the straight-traveling transmission case 17 is stopped or in a state where rotation of the straight-traveling input counter shaft 508 is stopped by a brake function of the brake mechanism 751 so that the left and right sun gears 726 are made stationary and fixed, when the hydraulic motor unit 705 of the hydraulic stepless transmission 701 is driven, a rotative force of the motor shaft 709 causes the left ring gear 728 to rotate forward (rotate reversely) and the right ring gear 728 to rotate reversely (rotate forward). As a result, one of the drive sprockets 62 of the left and right traveling crawlers 3 rotates forward, and the other rotates reversely so that the traveling body 2 turns on the spot (spin turn).

When the left and right ring gears 728 are driven by turning rotation of the hydraulic motor unit 705 of the hydraulic stepless transmission 701 with the left and right sun gears 726 being driven by straight-traveling rotation from the straight-traveling transmission case 17, a difference occurs between the speeds of the left and right traveling crawlers 3, and the traveling body 2 turns left or right (U turn) with a turning radius larger than a spin turn radius while traveling forward or reversely. The turning radius at this time is determined depending on the speed difference between the left and right traveling crawlers 3.

Description will now be given on a structure for switching a driving speed of the PTO shaft 25 that is performed through the PTO transmission mechanism 505 (three stages in the normal rotation direction and a single stage in the reverse rotation direction). In the straight-traveling transmission case 17, a PTO transmission mechanism 505 for transmitting a driving force from the engine 5 to the PTO shaft 25 is disposed. In this case, a PTO input shaft 591 extending coaxially with the main transmission input shaft 511 is coupled to the rear end of the main transmission input shaft 511 through a PTO hydraulic clutch 590 for engaging/disengaging transmission of a driving force. The straight-traveling transmission case 17 houses a PTO shifting shaft 592, a PTO counter shaft 593, and a PTO shaft 25 extending in parallel with the PTO input shaft 591. The PTO shaft 25 projects rearward from the rear surface of the straight-traveling transmission case 17.

When the PTO clutch switch 53 is operated for transmitting a driving force, the PTO hydraulic clutch 590 changes to a driving force connected state so that the main transmission input shaft 511 and the PTO input shaft 591 are coupled to each other to be relatively non-rotatable. As a result, a rotative force is transmitted from the main transmission input shaft 511 to the PTO input shaft 591.

The PTO input shaft 591 is provided with an intermediate-speed input gear 597, a low-speed input gear 595, a high-speed input gear 596, and a reversing shifter gear 598 that are disposed in this order from the front. The intermediate-speed input gear 597, the low-speed input gear 595, and the high-speed input gear 596 are fitted onto the PTO input shaft 591 to be relatively non-rotatable. The reversing shifter gear 598 is spline-fitted to the PTO input shaft 591 to be relatively non-rotatable and slidable in the axial direction.

On the other hand, a PTO intermediate-speed gear 601 that meshes with the intermediate-speed input gear 597, a PTO low-speed gear 599 that meshes with the low-speed input gear 595, and a PTO high-speed gear 600 that meshes with the high-speed input gear 596 are rotatably fitted onto the PTO shifting shaft 592. A pair of front and rear PTO transmission shifters 602 and 603 is spline-fitted to the PTO shifting shaft 592 to be relatively non-rotatable and slidable in the axial direction. The first PTO transmission shifter 602 is disposed between the PTO intermediate-speed gear 601 and the PTO low-speed gear 599. The second PTO transmission shifter 603 is disposed rearward of the PTO high-speed gear 600. The pair of front and rear PTO transmission shifters 602 and 603 is configured to slide in the axial direction in cooperation with an operation on the PTO transmission lever 46. A PTO transmission gear 604 is fixed to a portion of the PTO shifting shaft 592 between the PTO low-speed gear 599 and the PTO high-speed gear 600.

A PTO counter gear 605 that meshes with the PTO transmission gear 604, a PTO relay gear 606 that meshes with a PTO output gear 608 fitted onto the PTO shaft 25 to be relatively non-rotatable, and a PTO reverse gear 607 are fitted onto the PTO counter shaft 593 to be relatively non-rotatable. When a sub-PTO lever 48 is operated to turn on in a state where the PTO transmission lever 46 is in the state of having been operated to be in neutral, the reversing shifter gear 598 slides to mesh with the PTO reverse gear 607 of the PTO counter shaft 593.

When the PTO transmission lever 46 is operated for shifting, the pair of front and rear PTO transmission shifters 602 and 603 slides along the PTO shifting shaft 592 so that one of the PTO low-speed gear 595, the PTO intermediate-speed gear 597, and the PTO high-speed gear 596 is selectively coupled to the PTO shifting shaft 592. As a result, PTO shifted outputs corresponding to the low speed through the high speed are transmitted from the PTO shifting shaft 592 to the PTO counter shaft 593 through the PTO transmission gear 604 and the PTO counter gear 605, and then to the PTO shaft 25 through the PTO relay gear 606 and the PTO output gear 608.

When the sub-PTO lever 48 is operated to turn on, the reversing shifter gear 598 meshes with the PTO reverse gear 607, and a rotative force of the PTO input shaft 591 is transmitted to the PTO counter shaft 593 through the reversing shifter gear 598 and the PTO reverse gear 607. Then, a reverse PTO shifted output is transmitted from the PTO counter shaft 593 to the PTO shaft 25 through the PTO relay gear 606 and the PTO output gear 608.

The PTO transmission lever 46 and the sub-PTO lever 48 are cooperatively coupled to each other through a PTO restraining member (described in detail later), and are configured to inhibit achievement of both a transmission operation of the PTO transmission lever 46 except for neutral and a turning-on operation of the sub-PTO lever 48. That is, in a state where the sub-PTO lever 48 is operated to turn on, the PTO transmission lever 46 cannot be moved to a position except for neutral, and in a state where the PTO transmission lever 46 is operated to shift to a position except for neutral, the sub-PTO lever 48 cannot be operated to turn on.

Figure 12:
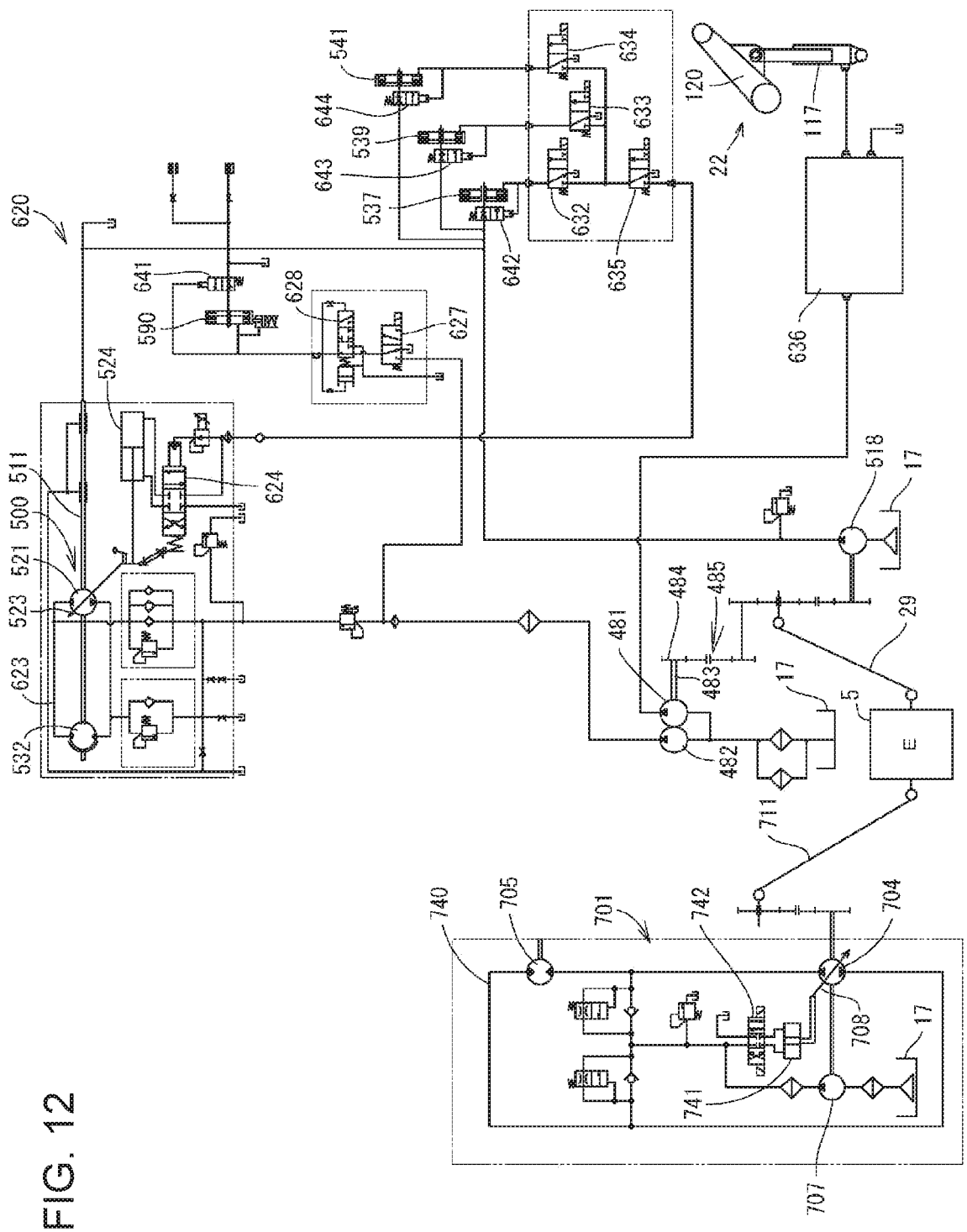

Next, with reference to FIG. 12, a configuration of a hydraulic circuit 620 of the tractor 1 will be described. The hydraulic circuit 620 of the tractor 1 includes the work machine hydraulic pump 481 and the traveling hydraulic pump 482 that are driven by a rotative force of the engine 5. In the embodiment, the straight-traveling transmission case 17 is used as a hydraulic oil tank, and hydraulic oil in the straight-traveling transmission case 17 is supplied to the work machine hydraulic pump 481 and the traveling hydraulic pump 482. The traveling hydraulic pump 482 is connected to a closed loop oil path 623 connecting the hydraulic pump unit 521 and the hydraulic motor unit 522 in the straight-traveling hydraulic mechanical stepless transmission 500. While the engine 5 is being driven, hydraulic oil from the traveling hydraulic pump 482 is constantly supplied to the closed loop oil path 623.

The traveling hydraulic pump 482 is connected to a main transmission hydraulic switching valve 624 for the main transmission hydraulic cylinder 524 of the hydraulic mechanical stepless transmission 500, a PTO clutch solenoid valve 627 for the PTO hydraulic clutch 590, and a switching valve 628 that is operated by the valve 627. In addition, the traveling hydraulic pump 482 is also connected to a forward low-speed clutch solenoid valve 632 for operating the forward low-speed hydraulic clutch 537, a forward high-speed clutch solenoid valve 633 for operating the forward high-speed hydraulic clutch 539, a reverse clutch solenoid valve 634 for operating the reverse hydraulic clutch 541, and a master control solenoid valve 635 for controlling hydraulic oil supply to the clutch solenoid valves 632 through 634.

The work machine hydraulic pump 481 is connected to a control valve mechanism 636 for supplying hydraulic oil to the left and right hydraulic lift cylinders 117 in the hydraulic lifting and lowering mechanisms 22. Although not shown, the control valve mechanism 636 includes, for example, a plurality of hydraulic pressure output valves stacked on the upper surface of the hydraulic lifting and lowering mechanisms 22 on a rear portion of the upper surface of the straight-traveling transmission case 17, a tilt control solenoid valve for controlling supply of hydraulic oil to a horizontal cylinder 122 disposed on the right lift rod 121, a lifting hydraulic switching valve, and a lowering hydraulic switching valve. The lifting hydraulic switching valve and the lowering hydraulic switching valve control hydraulic oil supply to the hydraulic lift cylinders 117 in the hydraulic lifting and lowering mechanisms 22.

In the control valve mechanism 636, when the tilt control solenoid valve is driven to switch, the horizontal cylinder 122 extends or contracts so that the right lower link 23 is lifted or lowered using a lower link pin in a front portion as a fulcrum. Consequently, the ground work machine tilts laterally relative to the traveling body 2 through the left and right lower links 23, the left and right tilt angles of the ground work machine change. When the lifting hydraulic switching valve or the lowering hydraulic switching valve is operated to switch, the hydraulic lift cylinders 117 extends or contracts, and both the lift arms 120 and the left and right lower links 23 are lifted or lowered. As a result, the ground work machine is lifted and lowered so that the height position in lifting or lowering the ground work machine changes.

The hydraulic circuit 620 of the tractor 1 includes the charge pump 707 that is driven by a rotative force of the engine 5. The charge pump 707 is connected to a closed loop oil path 740 connecting the hydraulic pump unit 704 and the hydraulic motor unit 705 to each other in the turning hydraulic stepless transmission 701. In the embodiment, the straight-traveling transmission case 17 is used as a hydraulic oil tank, and hydraulic oil in the straight-traveling transmission case 17 is supplied to the charge pump 707. While the engine 5 is being driven, hydraulic oil from the charge pump 707 is constantly supplied to the closed loop oil path 740. The hydraulic circuit 620 of the tractor 1 includes a turning hydraulic cylinder 741 for changing the angle of the pump swash plate 708 of the hydraulic pump unit 704 in the hydraulic stepless transmission 701, and a turning hydraulic switching valve 742 for the turning hydraulic cylinder 741.

The hydraulic circuit 620 of the tractor 1 also includes a lubricating oil pump 518 that is driven by a rotative force of the engine 5, in addition to the work machine hydraulic pump 481 and the traveling hydraulic pump 482. The lubricating oil pump 518 is connected to a PTO clutch hydraulic switching valve 641 for supplying hydraulic oil (lubricating oil) to a lubricating part of the PTO hydraulic clutch 590, a lubricating part of the main transmission input shaft 511 pivotally supporting the hydraulic mechanical stepless transmission 500, a forward low-speed clutch hydraulic switching valve 642 for supplying hydraulic oil (lubricating oil) to a lubricating part of the forward low-speed hydraulic clutch 537, a forward high-speed clutch hydraulic switching valve 643 for supplying hydraulic oil (lubricating oil) to a lubricating part of the forward high-speed hydraulic clutch 539, and a reverse clutch hydraulic switching valve 644 for supplying hydraulic oil (lubricating oil) to a lubricating part of the reverse hydraulic clutch 541. The hydraulic circuit 620 includes a relief valve, a flow-rate control valve, a check valve, an oil cooler, an oil filter, and so forth.

Figure 13:
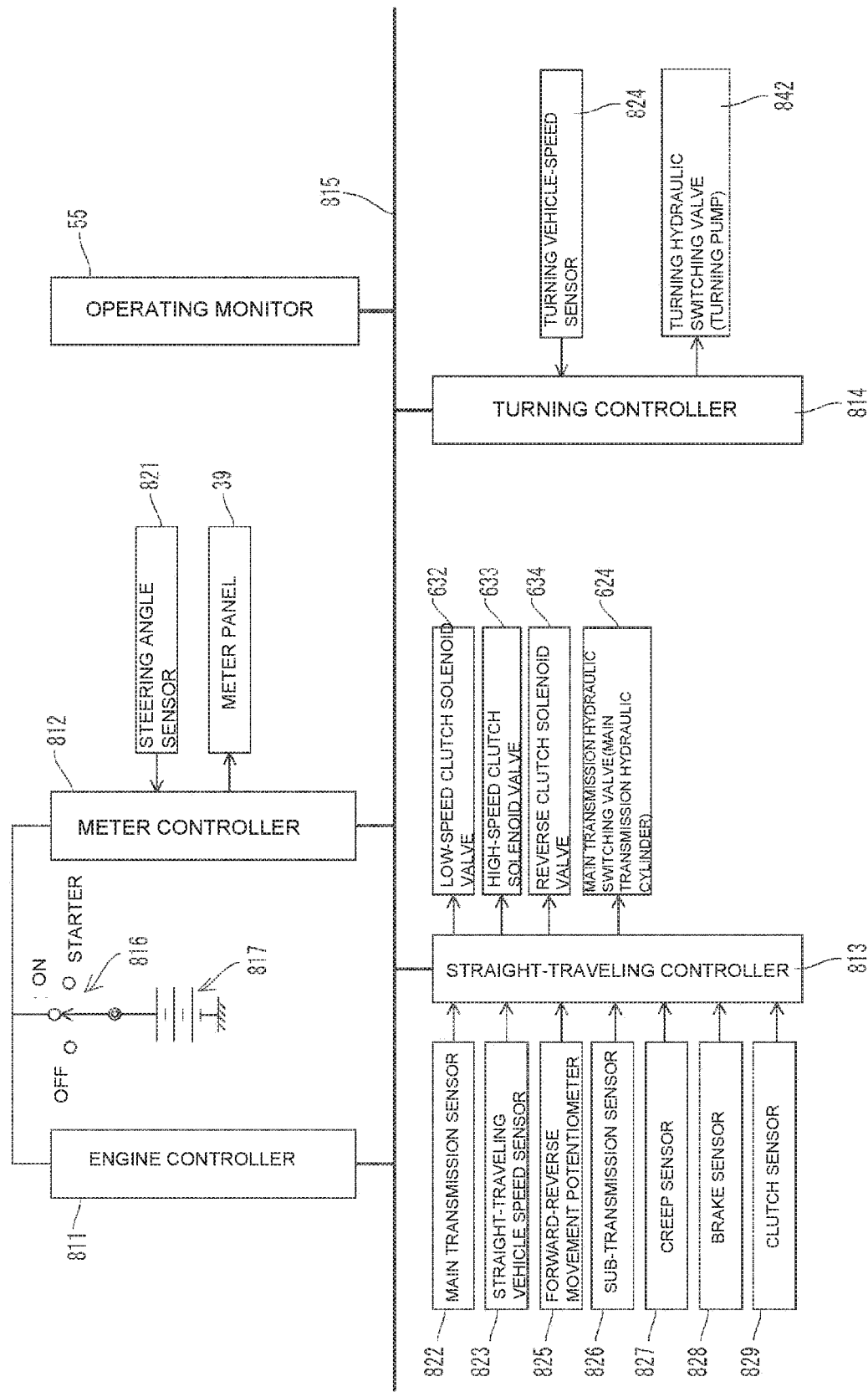

Thereafter, with reference to FIGS. 13 through 16, a configuration for executing traveling control of the tractor 1 will be described. As illustrated in FIG. 13, the tractor 1 includes: an engine controller 811 for controlling driving of the engine 5; a meter controller 812 for controlling a display operation of an operation display board (meter panel) 39 mounted on the dashboard 33; and a straight-traveling controller 813; and a turning controller 814. The straight-traveling controller 813 and the turning controller 814 are used for controlling the speed of the traveling body 2, for example.

Each of the controllers 811 through 814 and the operating monitor 55 includes, in addition to a CPU for executing various computation processes and control, a ROM for storing a control program and data, a RAM for temporarily storing a control program and data, a timer for counting the time, an input/output interface, and so forth, and is connected to each other through a CAN communication bus 815 so that these controllers and the monitor can communicate with one another. The engine controller 811 and the meter controller 812 are connected to a battery 817 through a power supply application key switch 816.

Based on control by the engine controller 811, in the engine 5, fuel in the fuel tank is pumped to a common rail by a fuel pump, and is stored in the common rail as high-pressure fuel. Then, the engine controller 811 controls (electronically controls) opening and closing of each fuel injection valve so that the high-pressure fuel in the unillustrated common rail is injected from injectors (not shown) to cylinders of the engine 5 under highly accurate control of injection pressure, injection timing, and injection period (injection amount).

A steering angle sensor (steering potentiometer) 821 for detecting the amount of rotation (steering angle) of the steering wheel 9 is connected to an input side of the meter controller 812. A liquid crystal panel and various alarm lamps on the meter panel 39 are connected to an output side of the meter controller 812. The meter controller 812 receives a detection signal from the steering angle sensor 821 and detects the steering angle of the steering wheel 9. The meter controller 812 outputs various signals to the meter panel 39, and controls lighting and extinguishing operations and blinking operations of the alarm lamps, display operations of the liquid crystal panel, and warning operations of an alarm buzzer.

The main transmission sensor (main transmission potentiometer) 822 for detecting an operation position of the main transmission lever 50, the straight-traveling pickup rotation sensor (straight-traveling vehicle speed sensor) 823 for detecting the number of rotations of a straight-traveling output (straight-traveling vehicle speed), a forward-reverse movement sensor (forward-reverse movement potentiometer) 825 for detecting an operation position of the forward-reverse switching lever 36, a sub-transmission sensor 826 for detecting an operation position of the sub-transmission lever 45, a creep sensor 827 for detecting an operation position of the ultra-low speed lever 44, a brake sensor 828 for detecting pressing of the brake pedal 35, and a clutch sensor 829 for detecting pressing of the clutch pedal 37 are connected to an input side of the straight-traveling controller 813.

The forward low-speed clutch solenoid valve 632 for causing the forward low-speed hydraulic clutch 537 to operate, the forward high-speed clutch solenoid valve 633 for causing the forward high-speed hydraulic clutch 539 to operate, the reverse clutch solenoid valve 634 for causing the reverse hydraulic clutch 541 to operate, and the main transmission hydraulic switching valve 624 for causing the main transmission hydraulic cylinder 524 to operate in accordance with the amount of a tilt operation of the main transmission lever 50 are connected to an output side of the straight-traveling controller 813.

The turning pickup rotation sensor (turning vehicle-speed sensor) 824 for detecting the number of rotations of a turning output (turning vehicle speed) is connected to an input side of the turning controller 814, whereas the turning hydraulic switching valve 742 for causing the turning hydraulic cylinder 741 to operate in accordance with the amount of rotation operation on the steering wheel 9 is connected to an output side of the turning controller 814.

Figure 14:
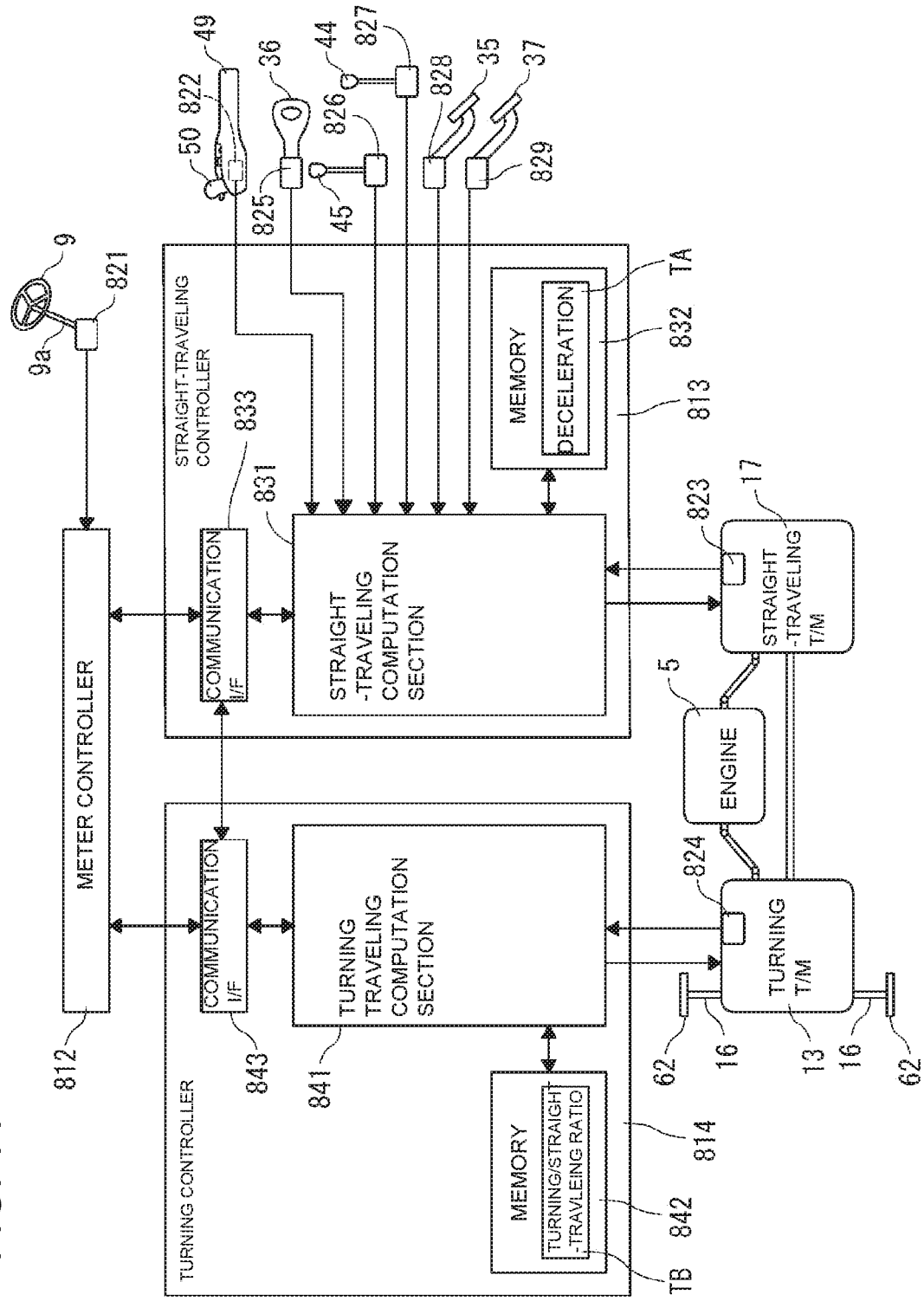
Figure 15:
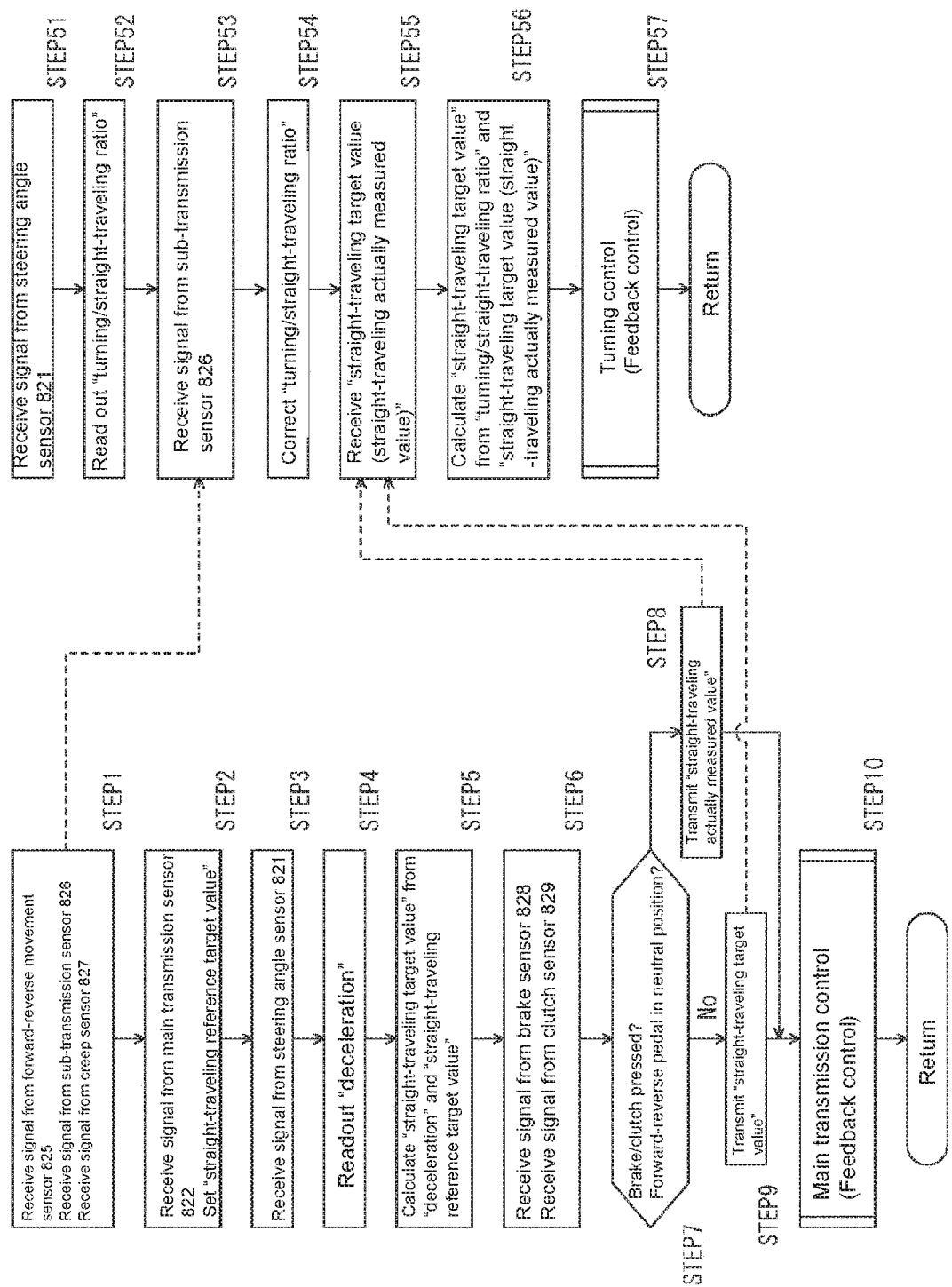
Figure 16:
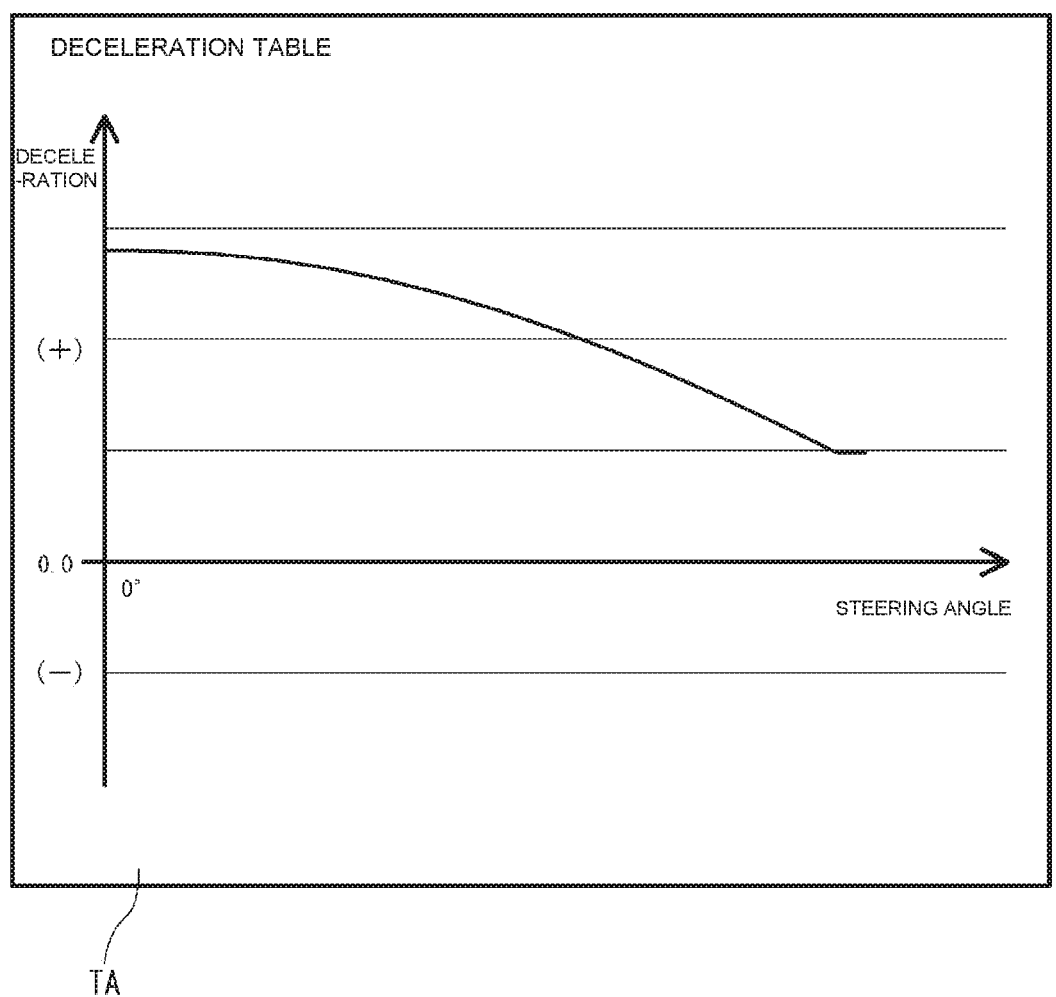

As illustrated in FIG. 14, the straight-traveling controller 813 includes: a straight-traveling computation section 831 for controlling an output of a straight-traveling system transmission path including the hydraulic mechanical stepless transmission (first stepless transmission) 500; a memory 832 for storing a deceleration table TA (see FIG. 16) in which a deceleration of a straight-traveling vehicle speed with respect to a steering angle of the steering wheel 9 is stored; and a communication interface 833 connected to the CAN communication bus 815. As shown in FIG. 15, the straight-traveling computation section 831 receives a signal from the forward-reverse movement sensor 825 to recognize which one of "forward," "neutral," and "reverse" is specified, and receives signals from the sub-transmission sensor 826 and the creep sensor 827 to recognize which one of "high-speed," "low-speed," and "ultra-low speed" is specified (STEP1). The straight-traveling computation section 831 receives a signal from the main transmission sensor 822 to calculate a target value of a straight-traveling vehicle speed in a straight-traveling state (where the steering angle is 0°) (hereinafter referred to as a "straight-traveling reference target value") (STEP2).

The straight-traveling controller 813 receives a signal from the steering angle sensor 821 with the communication interface 833 through the meter controller 812, and supplies the signal from the steering angle sensor 821 to the straight-traveling computation section 831 (STEP3). When the straight-traveling computation section 831 receives the signal from the steering angle sensor 821 and recognizes the steering angle of the steering wheel 9, the straight-traveling computation section 831 reads a deceleration of the straight-traveling vehicle speed based on the deceleration table TA in the memory 832 (STEP4). Then, the straight-traveling computation section 831 multiplies the straight-traveling reference target value based on the signal from the main transmission sensor 822 by the readout deceleration, thereby calculating a target value of the straight-traveling vehicle speed in accordance with the steering angle (hereinafter referred to as a "straight-traveling target value") (STEP5). The "straight-traveling vehicle speed" in each of the straight-traveling reference target value and the straight-traveling target value is a relative speed of the rotation speed of the traveling transmission shaft 536 in the straight-traveling transmission case 17 with respect to the rotation speed of the engine 5.

The straight-traveling computation section 831 receives signals from the brake sensor 828 and the clutch sensor 829 to determine whether each of the brake pedal 35 and the clutch pedal 37 is pressed or not (STEP6). If at least one of the brake pedal 35 and the clutch pedal 37 is pressed or the forward-reverse switching lever 36 is in the neutral position (Yes in STEP7), the straight-traveling computation section 831 transmits a signal from the straight-traveling pickup rotation sensor 823 (hereinafter referred to as a "straight-traveling actually measured value") from the communication interface 833 to the straight-traveling controller 813 (STEP8). On the other hand, if at least one of the brake pedal 35 and the clutch pedal 37 is not pressed or the forward-reverse switching lever 36 is in the forward position or the reverse position (No in STEP7), the straight-traveling computation section 831 transmits the calculated straight-traveling target value from the communication interface 833 to the straight-traveling controller 813 (STEP9).

When the straight-traveling computation section 831 has calculated the straight-traveling target value, the straight-traveling computation section 831 controls operations of the forward low-speed clutch solenoid valve 632, the forward high-speed clutch solenoid valve 633, and the main transmission hydraulic switching valve 624 in the case of forward traveling, whereas the straight-traveling computation section 831 controls operations of the reverse clutch solenoid valve 634 and the main transmission hydraulic switching valve 624 in the case of reverse traveling. At this time, based on the straight-traveling actually measured value (signal from the straight-traveling pickup rotation sensor 823) and the straight-traveling target value, the straight-traveling computation section 831 performs feedback control (main transmission control) on an output of the straight-traveling system transmission path (rotation speed by the straight-traveling output shaft 30) (STEP10). Based on a transmission gear ratio specified based on signals from the sub-transmission sensor 826 and the creep sensor 827, the rotation speed of the traveling transmission shaft 536 is determined from a signal from the straight-traveling pickup rotation sensor 823 and compared with the straight-traveling target value, and thereby, the output of the straight-traveling system transmission path is controlled.

Figure 17:
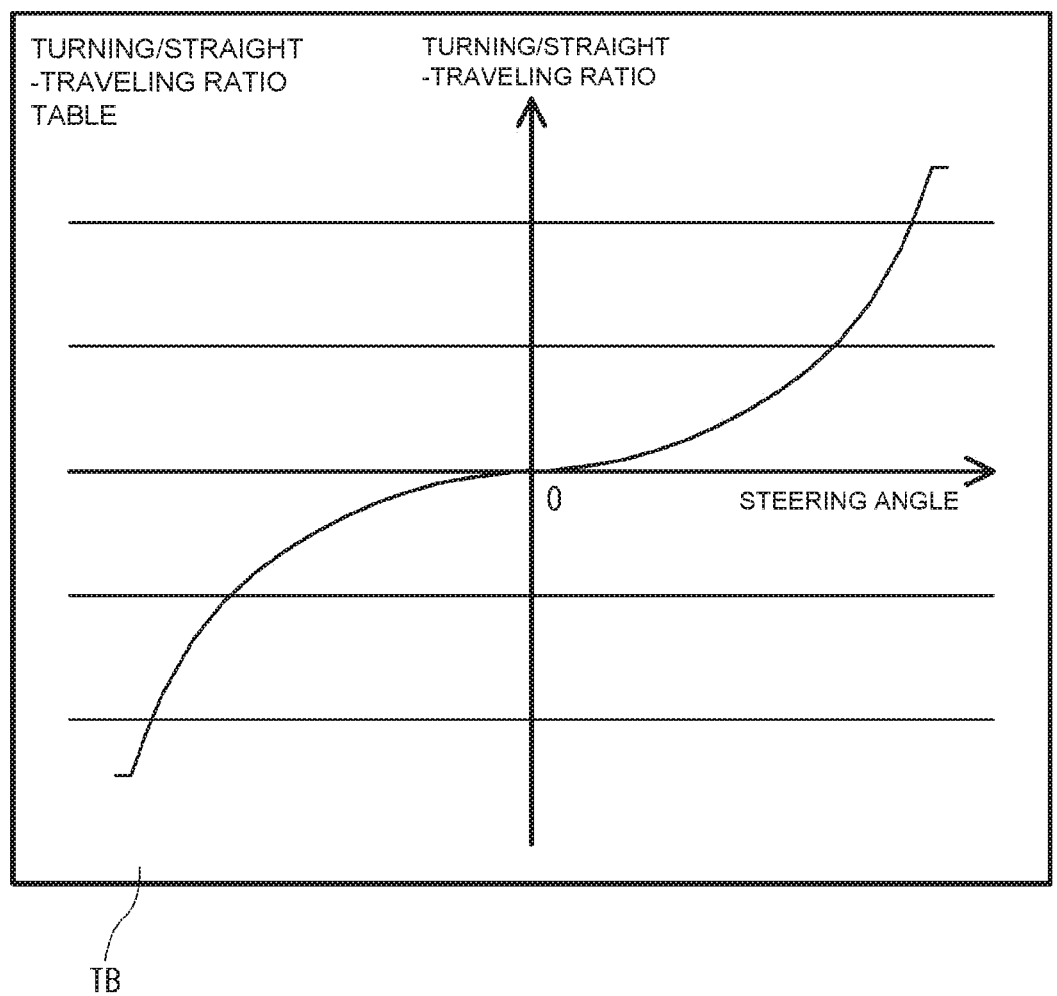

As illustrated in FIG. 14, the turning controller 814 includes: a turning traveling computation section 841 for controlling an output of a turning system transmission path including the hydraulic stepless transmission (second stepless transmission) 701; a memory 842 for storing a turning/straight-traveling ratio table TB (see FIG. 17) in which a turning/straight-traveling ratio of a straight-traveling vehicle speed and a turning vehicle speed with respect to the steering angle of the steering wheel 9; and a communication interface 843 that communicates with the CAN communication bus 815. As illustrated in FIG. 15, the turning controller 814 receives a signal from the steering angle sensor 821 with the communication interface 843 through the meter controller 812, and supplies the signal from the steering angle sensor 821 to the turning traveling computation section 841 (STEP51). When the turning traveling computation section 841 receives the signal from the steering angle sensor 821 and recognizes a steering angle of the steering wheel 9, the turning traveling computation section 841 reads a turning/straight-traveling ratio based on the turning/straight-traveling ratio table TB in the memory 842 (STEP52).

The turning controller 814 receives signals from the sub-transmission sensor 826 and the creep sensor 827 with the communication interface 843 through the straight-traveling controller 813, and supplies the signals to the turning traveling computation section 841 (STEP53). Based on the signals from the sub-transmission sensor 826 and the creep sensor 827, the turning traveling computation section 841 recognizes which one of "high-speed," "low-speed," and "ultra-low speed" is specified as a sub-transmission. The turning traveling computation section 841 reads a correction value of the turning/straight-traveling ratio from the memory 842 based on the specified sub-transmission, and based on the specified sub-transmission, the turning traveling computation section 841 corrects the turning/straight-traveling ratio (STEP54).

The turning controller 814 receives the straight-traveling target value calculated by the straight-traveling controller 813 or the straight-traveling actually measured value (signal from the straight-traveling pickup rotation sensor 823) with the communication interface 843, and supplies the received value to the turning traveling computation section 841 (STEP55). The turning traveling computation section 841 obtains a straight-traveling vehicle speed from the straight-traveling target value or the straight-traveling actually measured value, and multiplies the straight-traveling vehicle speed by the corrected turning/straight-traveling ratio, thereby calculating a turning target value as a turning vehicle speed (STEP56). The "turning vehicle speed" in the turning target value is a relative speed of the rotation speed of the motor shaft 709 in the turning transmission case 13 with respect to the rotation speed of the engine 5.

The turning traveling computation section 841 has calculated the turning target value and then controls an operation of the turning hydraulic switching valve 742. At this time, based on the signal from the turning pickup rotation sensor 824 (hereinafter referred to as a "turning actually measured value") and the turning target value, the turning traveling computation section 841 performs feedback control (turning control) of an output of the turning system transmission path (rotation speed by the motor shaft 709) (STEP57).

When the signal from the forward-reverse movement sensor 825 is switched "from forward to reverse" or "from reverse to forward" while main transmission control is being executed, the straight-traveling controller 813 controls the forward low-speed clutch solenoid valve 632 and the reverse clutch solenoid valve 634 to switch the forward low-speed hydraulic clutch 537 and the reverse hydraulic clutch 541. As described above, in switching the forward low-speed hydraulic clutch 537 and the reverse hydraulic clutch 541, the straight-traveling controller 813 performs control in such a manner that one of the forward low-speed hydraulic clutch 537 and the reverse hydraulic clutch 541 is constantly engaged.

At this time, the main transmission hydraulic switching valve 624 is controlled by changing the straight-traveling reference target value (or the straight-traveling target value) so that the main transmission output shaft 512 and the traveling relay shaft 535 are in lowest rotation speed states, and then, the numbers of rotations of the main transmission output shaft 512 and the traveling relay shaft 535 are increased to the original numbers of rotations again. Thus, by receiving the straight-traveling target value from the straight-traveling controller 813, the turning controller 814 can change the turning target value in a manner similar to the straight-traveling target value. In this manner, the turning controller 814 can reverse an output of the turning system transmission path (turning vehicle speed) in association with an operation on the steering wheel 9 between forward traveling and reverse traveling of the traveling body 2, thereby providing an operator with smooth operability.

In a case where the main transmission lever 50 is operated to the high-speed side or the low-speed side with a signal from the forward-reverse movement sensor 825 being in the "forward" state while the main transmission control is being executed, the straight-traveling controller 813 controls the forward low-speed clutch solenoid valve 632 and the forward high-speed clutch solenoid valve 633 to switch the forward low-speed hydraulic clutch 537 and the forward high-speed hydraulic clutch 539. As described above, in switching the forward low-speed hydraulic clutch 537 and the forward high-speed hydraulic clutch 539, the straight-traveling controller 813 performs control in such a manner that one of the forward low-speed hydraulic clutch 537 and the forward high-speed hydraulic clutch 539 is constantly engaged.

At this time, the straight-traveling controller 813 controls the main transmission hydraulic switching valve 624 in accordance with the straight-traveling target value. Since the turning controller 814 sets an output of the turning system transmission path (turning vehicle speed) in association with an operation on the steering wheel 9 by receiving the straight-traveling target value from the straight-traveling controller 813, the turning controller 814 can control the output of the turning system transmission path (turning vehicle speed) in accordance with an output of the straight-traveling system transmission path (straight-traveling vehicle speed) without complicated computation, independently of switching of the forward low-speed hydraulic clutch 537 and the forward high-speed hydraulic clutch 539.

In a case where each of the forward low-speed hydraulic clutch 537, the forward high-speed hydraulic clutch 539, and the reverse hydraulic clutch 541 are controlled to be disengaged by pressing the clutch pedal 37, for example, the straight-traveling controller 813 transmits the straight-traveling actually measured value (signal from the straight-traveling pickup rotation sensor 823) to the turning controller 814. Then, the turning controller 814 sets the output of the turning system transmission path (turning vehicle speed) based on the straight-traveling actually measured value (signal from the straight-traveling pickup rotation sensor 823). Thus, even in a case where both the forward high-speed hydraulic clutch 539 and the reverse hydraulic clutch 541 are disengaged and the output of the straight-traveling system transmission path (straight-traveling vehicle speed) does not correspond to the straight-traveling target value, the output of the turning system transmission path (turning vehicle speed) can be optimized, and thus, the operator can operate the vehicle without incongruity.

When the brake pedal 35 is pressed, the straight-traveling controller 813 controls the forward low-speed hydraulic clutch 537, the forward high-speed hydraulic clutch 539, and the traveling hydraulic clutch 541 so that these clutches are disengaged in a high-speed range where the traveling speed (straight-traveling vehicle speed) is a predetermined speed or more, whereas the straight-traveling controller 813 controls the forward low-speed hydraulic clutch 537 or the reverse hydraulic clutch 541 so that the clutch 537 or 541 is engaged in accordance with forward-reverse movement of the vehicle in a low-speed range where the traveling speed (straight-traveling vehicle speed) is less than the predetermined speed. At this time, the straight-traveling controller 813 and the turning controller 814 set the output of the turning system transmission path (turning vehicle speed) based on the straight-traveling actually measured value (signal from the straight-traveling pickup rotation sensor 823). Thus, even in a case where the output of the straight-traveling system transmission path (straight-traveling vehicle speed) does not correspond to the straight-traveling target value while brake control by an operation on the brake pedal 35 is being executed, the output of the turning system transmission path (turning vehicle speed) can be decelerated in accordance with the output of the straight-traveling system transmission path (straight-traveling vehicle speed), and thus, the operator can operate the vehicle without incongruity.

The turning controller 814 decelerates the output of the turning system transmission path (turning vehicle speed) in accordance with the deceleration of the output of the straight-traveling system transmission path (straight-traveling vehicle speed). Then, when the steering wheel 9 is operated, the turning controller 814 accelerates the output of the turning system transmission path (turning vehicle speed), and the turning controller 814 decelerates the output of the straight-traveling system transmission path (straight-traveling vehicle speed) so that a speed ratio of the left and right traveling crawlers 3 in turning can be determined based on the steering angle of the steering wheel 9.

Figure 18:
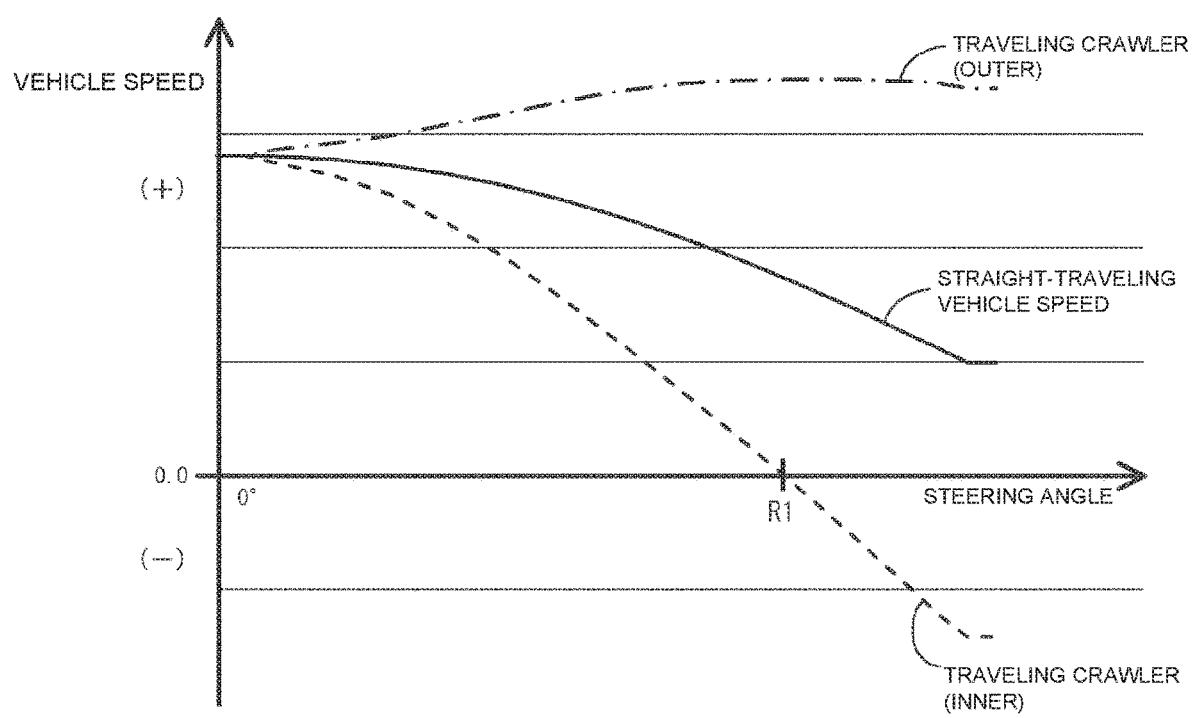

In a case where the steering angle of the steering wheel 9 is less than a predetermined value R1 as illustrated in FIG. 18 by execution of the control described above by the straight-traveling controller 813 and the turning controller 814, the inner traveling crawler 3 is decelerated. In a case where the steering angle of the steering wheel 9 is the predetermined value R1, the inner traveling crawler 3 is stopped. In a case where the steering angle of the steering wheel 9 exceeds the predetermined value R1, the inner traveling crawler 3 is reversely rotated. In this manner, the turning center and the turning radius of the traveling body 2 can be changed in accordance with the amount of operation on the steering wheel 9. Accordingly, the traveling body 2 can turn in a state close to an operation feeling to the steering wheel 9, resulting in stable traveling of the traveling body 2.

Figure 19:
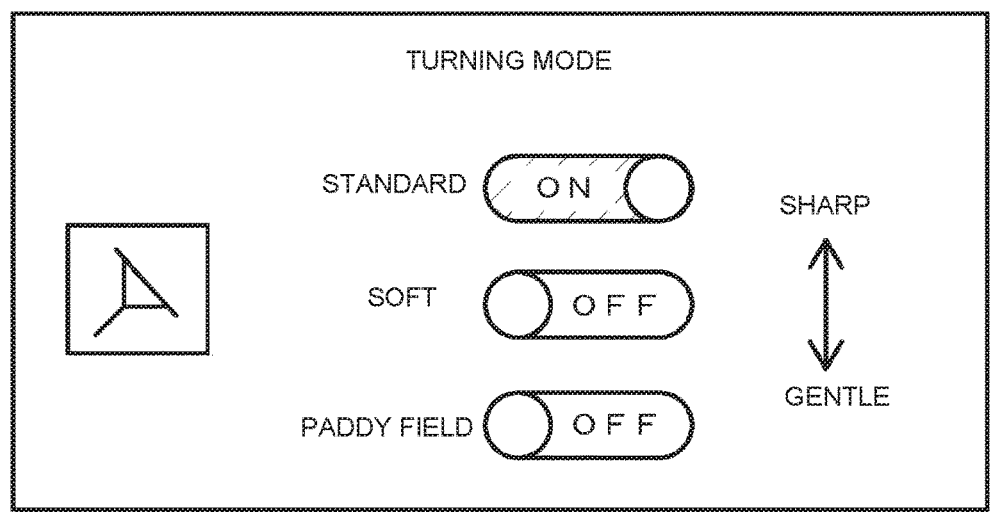
Figure 20:
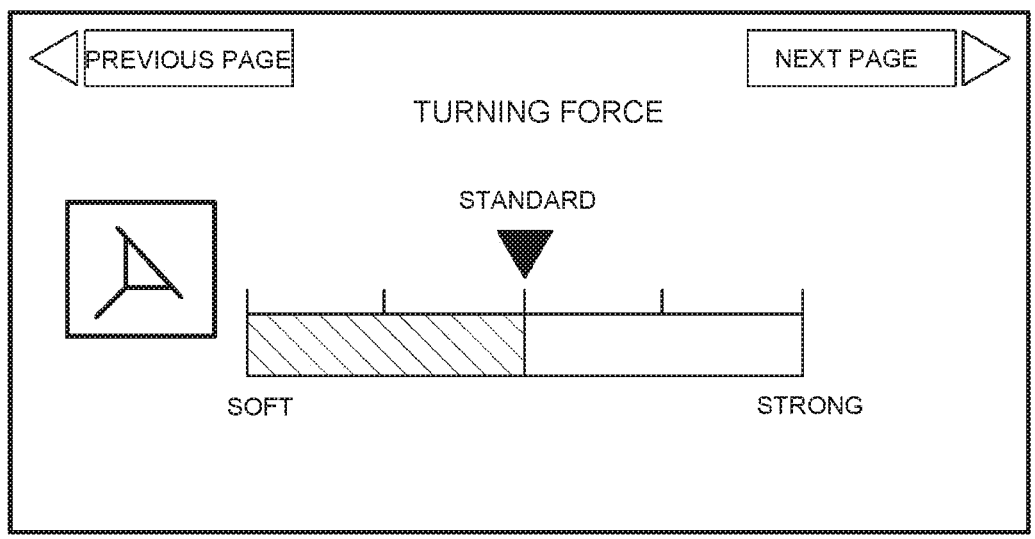

As illustrated in FIG. 19, by operating the operating monitor 55, the operator can select a "standard mode" in which automatic deceleration acts in turning to enable sharp turn (spin turn), a "soft mode" in which the turn is gentle in a first half of the wheel steering angle as compared to the standard mode, and a "paddy field mode" in which the turn is gentle in a last half of the wheel steering angle as compared to the standard mode. In addition, as illustrated in FIG. 20, by operating the operating monitor 55, the operator can adjust a turning force in turning in a plurality of stages. Thus, by operating the operating monitor 55, the operator can select one of a plurality of modes and, in addition, can adjust the driving force stepwise. Thus, the operator can easily select traveling characteristics (turning characteristics) appropriate for, for example, field conditions.

In the case of specifying the "standard mode" as described above, when the steering angle of the steering wheel 9 exceeds the predetermined value R1, the inner traveling crawler 3 is caused to rotate reversely, and the traveling body 2 is caused to turn by spin turn. In the case of specifying the "soft mode," when the steering angle of the steering wheel 9 is set at maximum, the inner traveling crawler 3 is stopped, and the traveling body 2 is caused to turn by brake turn. In the case of specifying the "paddy field mode," even when the steering angle of the steering wheel 9 is set at maximum, the inner traveling crawler 3 is not stopped, and the traveling body 2 gently turns.

The steering wheel 9 is attached in such a manner that the maximum steering angle from the neutral position to each of the left and right is limited to angle $\theta 1$ (e.g., 250°) ranging from 180° to 270°. In the operating monitor 55, in a case where the "standard mode" is selected on the screen illustrated in FIG. 19, when a center turning force (standard value) is selected on the screen illustrated in FIG. 20, a maximum steering angle $\theta 2$ of the steering wheel 9 in control is substantially equal to the maximum steering angle $\theta 1$ (e.g., 245°) in mechanism. When the maximum turning force (strong) is specified on the screen illustrated in FIG. 20, the maximum steering angle $\theta 2$ of the steering wheel 9 in control is an angle (e.g., 210°) smaller than the maximum steering angle $\theta 1$ in mechanism. When the minimum turning force (weak) is specified on the screen illustrated in FIG. 20, the maximum steering angle $\theta 2$ of the steering wheel 9 in control is an angle (e.g., 280°) larger than the maximum steering angle $\theta 1$ in mechanism.

As described above, since the maximum steering angle $\theta 2$ in control can be switched based on the turning force specified by an operation on the operating monitor 55, the traveling body 2 can be controlled in accordance with operability desired by the operator. In a case where the maximum turning force (strong) is specified, the maximum steering angle $\theta 2$ of the steering wheel 9 in control is reduced so that control with high responsiveness to the operator can be performed. At this time, a large margin can be obtained in steering the steering wheel 9, and thus, the steering wheel 9 can be turned without efforts. On the other hand, in a case where the maximum turning force (weak) is specified, the steering angle can be limited by increasing the maximum steering angle $\theta 2$ of the steering wheel 9 in control. Thus, a steep turn of the traveling body 2 can be reduced, and the traveling body 2 can be operated with stability.

The configurations of components in the present invention are not limited to those of the illustrated embodiment, and can be variously changed without departing from the gist of the invention.

REFERENCE SIGNS LIST

2 traveling body
3 traveling crawler 4 rear wheel
5 diesel engine
8 cockpit seat
13 turning transmission case
17 straight-traveling transmission case
500 hydro-static mechanical transmission
501 forward-reverse switching mechanism
502 creep transmission gear mechanism
503 sub-transmission gear mechanism
511 main transmission input shaft
512 main transmission output shaft
521 hydraulic pump unit
522 hydraulic motor unit
523 pump swash plate
524 main transmission hydraulic cylinder
526 planetary gear mechanism
535 traveling relay shaft
537 forward low-speed hydraulic clutch
539 forward high-speed hydraulic clutch
541 reverse hydraulic clutch
624 main transmission hydraulic switching valve
642 forward low-speed clutch hydraulic switching valve
643 forward high-speed clutch hydraulic switching valve
644 reverse clutch hydraulic switching valve
701 hydraulic stepless transmission (HST)
702 differential gear mechanism
703 planetary gear mechanism
704 hydraulic pump unit
705 hydraulic motor unit
706 pump shaft
707 charge pump
708 pump swash plate
709 motor shaft
741 turning hydraulic cylinder
742 turning hydraulic switching valve
813 straight-traveling controller
814 turning controller
821 steering angle sensor
822 main transmission sensor
823 straight-traveling pickup rotation sensor
824 turning pickup rotation sensor
825 forward-reverse movement sensor
826 sub-transmission sensor
827 creep sensor
828 brake sensor
829 clutch sensor
831 straight-traveling computation section
832 memory
833 communication interface
841 turning traveling computation section
842 memory
843 communication interface
TA deceleration table
TB turning/straight-traveling ratio table

The invention claimed is:

1. A work vehicle including an engine that is mounted on a vehicle body, a straight-traveling system transmission path including a first stepless transmission, and a turning system transmission path including a second stepless transmission, the work vehicle being configured to combine an output of the straight-traveling system transmission path and an output of the turning system transmission path to drive left and right traveling units, the work vehicle comprising:
a controller configured to control the output of the straight-traveling system transmission path and the output of the turning system transmission path in cooperation with each other;
a transmission sensor configured to output an instruction value of the straight-traveling system transmission path; and
a detector configured to detect a measured value of the straight-traveling system transmission path,
wherein the controller is configured to select one of:
the instruction value from the transmission sensor, and
the measured value from the detector to set the output of the turning system transmission path.

2. The work vehicle according to claim 1, wherein:
the straight-traveling system transmission path includes a forward-reverse switching mechanism,
the forward-reverse switching mechanism includes a reverse clutch, a forward low-speed clutch, and a forward high-speed clutch, and
when switching between the reverse clutch and the forward low-speed clutch, the controller is configured to perform control in such a manner that one of the reverse clutch and the forward low-speed clutch is constantly engaged.

3. The work vehicle according to claim 2, wherein the work vehicle is configured such that, in a case where each of the clutches is disengaged in traveling, the output of the turning system transmission path is set in accordance with the measured value from the detector.

4. The work vehicle according to claim 2, wherein:
in a case where a brake is operated in traveling, the controller is configured to set the output of the turning system transmission path in accordance with the measured value from the detector, and
the controller is configured to control the clutches in such a manner that each of the clutches is disengaged in a high-speed range where a traveling speed is a predetermined speed or more, and one of the reverse clutch and the forward low-speed clutch or one of the forward low-speed clutch and the forward high-speed clutch is engaged in a low-speed range where the traveling speed is less than the predetermined speed.

5. The work vehicle according to claim 1, further comprising:
a transmission lever; and
wherein the transmission sensor is configured to detect an operation position of the transmission lever and to specify the output of the straight-traveling system transmission path based on the detected operation position.

6. A work vehicle comprising:
a first stepless transmission configured for straight traveling;
a second stepless transmission configured for turning the work vehicle;
a main transmission sensor configured to:
detect a position of a lever for specifying an instruction value of the first stepless transmission; and
output the instruction value;
a second sensor configured to detect a measured value of an output of the first stepless transmission; and
a controller configured to set an output of the second stepless transmission based on selecting one of:
the instruction value output by the main transmission sensor; and
the measured value from the second sensor.

7. The work vehicle of claim 6, wherein the controller is further configured to:
calculate a target value based on the instruction value; and
set the output of the second stepless transmission based on selecting one of:

the target value; and the measured value from the second sensor.

8. The work vehicle of claim 7, wherein the controller is further configured to compare the measured value to the target value.

9. The work vehicle of claim 6, wherein the controller is further configured to:
combine the output of the second stepless transmission and the output of the first stepless transmission to drive left and right traveling units; and
control the output of the first stepless transmission and the output of the second stepless transmission in cooperation with each other.

10. The work vehicle of claim 6, further comprising:
a reverse clutch;
a forward low-speed clutch; and
a forward high-speed clutch.

11. The work vehicle of claim 10, further comprising:
a forward-reverse movement sensor; and
wherein, the controller is further configured to, based on receiving a signal from the forward-reverse movement sensor, switch between the reverse clutch and the forward low-speed clutch in such a manner that one of the reverse clutch or the forward low-speed clutch is constantly engaged.

12. The work vehicle of claim 11, further comprising:
a switching lever; and
wherein the controller is configured to, based on the switching lever being in a neutral position, set the output of the second stepless transmission based on the measured value.

13. The work vehicle of claim 12, wherein each of the reverse clutch, the forward low-speed clutch, and the forward high-speed clutch are disengaged while the switching lever is in a neutral position.

14. The work vehicle of claim 11, further comprising:
a brake pedal; and
wherein the controller is configured to, while the brake pedal is in a pressed state, set the output of the second stepless transmission based on the measured value.

15. The work vehicle of claim 14, wherein the controller is configured to, while the brake pedal is in a pressed state:
control the forward low-speed clutch, and the forward high-speed clutch in such a manner that each of the clutches are disengaged in a high-speed range; and
control the forward low-speed clutch or the reverse clutch such that one of the clutches is engaged in a low speed range.

16. The work vehicle of claim 15, wherein:
the high speed range corresponds to the traveling speed being greater than equal to a predetermined speed; and
the low speed range corresponds to the traveling speed being less than the predetermined speed.

17. The work vehicle according to claim 6, further comprising the lever.

18. A control system for a work vehicle, the control system comprising:
a controller configured to:
receive, from a main transmission sensor, an instruction value of a first stepless transmission configured for straight traveling based on an operation position of a lever for specifying the instruction value, the operation position detected by the main transmission sensor;
receive, from a second sensor, a measured value of an output of the first stepless transmission; and
set an output of a second stepless transmission configured for turning the work vehicle based on selecting one of:
the instruction value received by the controller; and
the measured value from the second sensor.

19. The control system of claim 18, wherein the controller is further configured to:
calculate a target value based on the instruction value;
compare the measured value to the target value; and
set the output of the second stepless transmission based on selecting one of:
the target value; and
the measured value from the second sensor.

20. The control system of claim 18, further comprising the lever.

* * * * *